United States Patent
Zhang et al.

(10) Patent No.: US 12,255,853 B2
(45) Date of Patent: *Mar. 18, 2025

(54) METHODS AND APPARATUS FOR SETTING SUBBAND CSI-RELATED PARAMETERS

(71) Applicant: QUALCOMM Incorporated, San Diego, CA (US)

(72) Inventors: Yu Zhang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,216

(22) Filed: May 24, 2023

(65) Prior Publication Data

US 2023/0388093 A1    Nov. 30, 2023

Related U.S. Application Data

(63) Continuation of application No. 17/385,721, filed on Jul. 26, 2021, now Pat. No. 11,677,533, which is a continuation of application No. 16/341,794, filed as application No. PCT/CN2017/109437 on Nov. 4, 2017, now Pat. No. 11,075,739.

(51) Int. Cl.
*H04L 5/00* (2006.01)
*H04W 72/0453* (2023.01)
*H04W 72/23* (2023.01)

(52) U.S. Cl.
CPC .......... *H04L 5/0094* (2013.01); *H04L 5/0048* (2013.01); *H04W 72/0453* (2013.01); *H04W 72/23* (2023.01)

(58) Field of Classification Search
CPC .. H04B 7/0626; H04W 72/25; H04W 72/566; H04W 72/1263; H04W 72/02; H04W 52/02; H04W 72/232; H04W 24/10
See application file for complete search history.

(56) References Cited

U.S. PATENT DOCUMENTS

| | | |
|---|---|---|
| 8,599,708 B2 | 12/2013 | Chen et al. |
| 11,075,739 B2 | 7/2021 | Zhang et al. |
| 11,677,533 B2 | 6/2023 | Zhang et al. |
| 2011/0034198 A1 | 2/2011 | Chen et al. |
| 2012/0076028 A1 | 3/2012 | Ko et al. |
| 2012/0172076 A1* | 7/2012 | Seki ................ H04B 7/0658 455/509 |
| 2013/0078913 A1 | 3/2013 | Lee et al. |
| 2013/0202057 A1 | 8/2013 | Chen et al. |

(Continued)

FOREIGN PATENT DOCUMENTS

| | | |
|---|---|---|
| CN | 102291744 A | 12/2011 |
| CN | 102801498 A | 11/2012 |

(Continued)

OTHER PUBLICATIONS

CATT, "Discussion on CSI-RS Overhead Reduction for class B", R1-166441, 3GPP TSG RAN WG1 #86, 3GPP Gothenburg, Sweden, Aug. 22-26, 2016, (Aug. 13, 2016), 3 Pages.

(Continued)

*Primary Examiner* — Iqbal Zaidi

(57) ABSTRACT

Certain aspects of the present disclosure relate to methods and apparatus for flexibly setting subband CSI-related parameters.

30 Claims, 23 Drawing Sheets

(56) References Cited

U.S. PATENT DOCUMENTS

| | | | |
|---|---|---|---|
| 2014/0293815 | A1 | 10/2014 | Xia et al. |
| 2015/0003271 | A1 | 1/2015 | Park et al. |
| 2017/0063436 | A1 | 3/2017 | Li |
| 2017/0310384 | A1 | 10/2017 | Park et al. |
| 2017/0331645 | A1 | 11/2017 | Baligh et al. |
| 2018/0092627 | A1 | 4/2018 | Susumu |
| 2019/0342782 | A1 | 11/2019 | Yum et al. |

FOREIGN PATENT DOCUMENTS

| | | |
|---|---|---|
| CN | 103166734 A | 6/2013 |
| CN | 104350689 A | 2/2015 |
| CN | 104620627 A | 5/2015 |
| CN | 105493433 A | 4/2016 |
| CN | 106059737 A | 10/2016 |
| EP | 2963970 A1 | 1/2016 |
| WO | 2009131225 A1 | 10/2009 |
| WO | 2011088403 A1 | 7/2011 |
| WO | 2011119005 A2 | 9/2011 |
| WO | 2011160557 A1 | 12/2011 |
| WO | 2014139303 A1 | 9/2014 |
| WO | 2015172393 A1 | 11/2015 |
| WO | 2016056824 A1 | 4/2016 |

OTHER PUBLICATIONS

Ericsson: "CSI-RS Design for Class A eFD-MIMO", 3GPP TSG-RAN WG1#84bis, R1-163079, 3rd Generation Partnership Project (3GPP), Mobile Competence Centre, 650, Route Des Lucioles, F-06921, Sophia-Antipolis Cedex, France, Apr. 11-15, 2016, 5 Pages.

International Search Report and Written Opinion—PCT/CN2016/104617—ISA/EPO—Jul. 31, 2017.

International Search Report and Written Opinion—PCT/CN2017/109437—ISA/EPO—Jan. 29, 2018.

LG Electronics: "Design Considerations on NR CSI-RS", 3GPP Draft, 3GPP TSG RAN WG1 Meeting #86b, R1-1609257, 3rd Generation Partnership Project (3GPP), Mobile Competence Centre, 650, Route Des Lucioles, F-06921 Sophia-Antipolis Cedex, France, vol. RAN WG1. No. Lisbon. Portugal, Oct. 10, 2016-Oct. 14, 2016 Oct. 9, 2016 (Oct. 9, 2016), XP051149303, 4 Pages.

LG Electronics: "Views on CSI Acquisition for NR", 3GPP Draft, 3GPP TSG RAN WG1 Meeting #86b, R1-1609253, 3rd Generation Partnership Project (3GPP), Mobile Competence Centre, 650, Route Des Lucioles, F-06921 Sophia-Antipolis Cedex, France, vol. RAN WG1. No. Lisbon. Portugal, Oct. 10, 2016-Oct. 14, 2016 Oct. 9, 2016 (Oct. 9, 2016), XP051149299, 7 Pages.

Samsung: "Discussions on CSI-RS Enhancements for Class A CSI Reporting in eFD-MIMO", 3GPP TSG RAN WG1 Meeting #84bis, R1-162684, 3rd Generation Partnership Project (3GPP), Mobile Competence Centre, 650, Route Des Lucioles, F-06921, Sophia-Antipolis Cedex, France, Apr. 11-15, 2016, pp. 1-6.

Supplementary European Search Report—EP17868002—Search Authority—The Hague—jUL. 7, 2020.

European Search Report—EP17868002—Search Authority—The Hague—Jun. 3, 2024.

HTC: "CSI-RS based IMR in Comp", 3GPP TSG-RAN WG1 #69, R1-122324, No. Prague, Czech Republic, May 21, 2012-May 25, 2012, pp. 1-2.

3GPP TS 38.331: "3rd Generation Partnership Project, Technical Specification Group Radio Access Network, NR, Radio Resource Control (RRC) Protocol Specification (Release 15)", 3GPP TS 38.331 V15.12.0, Dec. 2020, pp. 1-537.

* cited by examiner

|  |  | PMI Feedback Type | | |
|---|---|---|---|---|
|  |  | No PMI | Single PMI | Multiple PMI |
| PUSCH CQI Feedback Type | Wideband (wideband CQI) | Mode 1-0 | Mode 1-1 | Mode 1-2 |
|  | UE Selected (subband CQI) | Mode 2-0 |  | Mode 2-2 |
|  | Higher Layer configured (subband CQI) | Mode 3-0 | Mode 3-1 | Mode 3-2 |

FIG. 8A

|  |  | PMI Feedback Type | |
|---|---|---|---|
|  |  | No PMI | Single PMI |
| PUSCH CQI Feedback Type | Wideband (wideband CQI) | Mode 1-0 | Mode 1-1 |
|  | UE Selected (subband CQI) | Mode 2-0 | Mode 2-1 |

FIG. 8B

| System Bandwidth ($N_{RB}^{DL}$) [RBs] | Subband Size ($k$) [RBs] |
|---|---|
| 6-7 | NA |
| 8-10 | 4 |
| 11-26 | 4 |
| 27-63 | 6 |
| 64-110 | 8 |

FIG. 9A

| System Bandwidth ($N_{RB}^{DL}$) [RBs] | Subband Size ($k$) [RBs] | Number of subbands ($M$) |
|---|---|---|
| 6-7 | NA | NA |
| 8-10 | 2 | 1 |
| 11-26 | 2 | 3 |
| 27-63 | 3 | 5 |
| 64-110 | 4 | 6 |

FIG. 9B

| System Bandwidth ($N_{RB}^{DL}$) [RBs] | Subband Size ($k$) [RBs] | Number of subbands ($M$) |
|---|---|---|
| 6-7 | NA | NA |
| 8-10 | 2 | 1 |
| 11-26 | 2 | 3 |
| 27-63 | 3 | 5 |
| 64-110 | 4 | 6 |

FIG. 9C

| Reporting Type | Reported | Mode State | Mode 2-1 [bits/BP] | Mode 2-0 [bits/BP] |
|---|---|---|---|---|
| 1 | Subband CQI | RI = 1 | 4+L | 4+L |
| | | RI > 1 | 7+L | 4+L$^1$<br>7+L$^2$ |
| 1a | Subband CQI/ second PMI | 8 APs or 8/12/16 APs w/ codebookConfig = {2, 3, 4}, RI = 1 | 8+L | NA |
| | | 8 APs or 8/12/16 APs w/ codebookConfig = {2, 3, 4}, 1 < RI < 5 | 9+L | NA |
| | | 8 APs or 8/12/16 APs w/ codebookConfig = {1, 2, 3, 4} RI > 4 | 7+L | NA |
| | | 8/12/16 APs w/ codebookConfig = 1, RI = 1 | 6+L | NA |
| | | 8/12/16 APs w/ codebookConfig = 1, RI = 2 | 9+L | NA |
| | | 8/12/16 APs w/ codebookConfig = 1, 2<RI<5 | 8+L | NA |
| | | 4 APs RI = 1 | 8+L | NA |
| | | 4 APs 1 < RI ≤ 4 | 9+L | NA |

FIG. 9D

METHODS AND APPARATUS FOR SETTING SUBBAND CSI-RELATED PARAMETERS

CROSS-REFERENCE TO RELATED APPLICATIONS

This present Application is a Continuation of U.S. patent application Ser. No. 17/385,721 entitled "METHODS AND APPARATUS FOR SETTING SUBBAND CSI-RELATED PARAMETERS" filed Jul. 26, 2021 which claims benefit of U.S. patent application Ser. No. 16/341,794, entitled "METHODS AND APPARATUS FOR SETTING SUBBAND CSI-RELATED PARAMETERS" filed Apr. 12, 2019, now U.S. Granted Pat. No. 11,075,739 on Jul. 27, 2021, which is a national stage application under 35 U.S.C. 371 of PCT/CN2017/109437, entitled "METHODS AND APPARATUS FOR SETTING SUBBAND CSI-RELATED PARAMETERS" filed Nov. 4, 2017, which claims benefit of Application Serial No. PCT/CN2016/104617 entitled "METHODS AND APPARATUS FOR SETTING SUBBAND CSI-RELATED PARAMETERS", filed Nov. 4, 2016, all of which are incorporated herein by reference in their entireties.

BACKGROUND

Field of the Disclosure

The present disclosure relates generally to communication systems, and more particularly, to methods and apparatus for setting subband CSI-related parameters.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for setting subband CSI-related parameters.

Certain aspects provide a method for wireless communication by a base station. The method generally includes determining, for a user equipment (UE), partial band settings for one or more sets of partial bands within a system bandwidth, wherein each partial band set includes one or more partial bands that each includes a set of physical resource blocks (PRBs) and communicating with the UE, in accordance with the partial band settings.

Certain aspects provide a method for wireless communication by a user equipment. The method generally includes determining partial band settings for one or more sets of partial bands within a system bandwidth, wherein each partial band set includes one or more partial bands that each includes a set of physical resource blocks (PRBs) and communicating with at least one base station (BS), in accordance with the partial band settings.

Certain aspects provide a method for wireless communication by a base station. The method generally includes determining, for a user equipment (UE), partial band channel state information (CSI) reference signal (CSI-RS) settings for one or more partial bands within a system bandwidth for channel state information (CSI)-related processing, wherein each partial band includes a set of physical resource blocks (PRBs), transmitting partial band CSI reference signals (CSI-RS) to the UE, and receiving CSI-reporting from the UE, in accordance with the partial band CSI-RS settings.

Certain aspects provide a method for wireless communication by a user equipment. The method generally includes determining partial band channel state information (CSI) reference signal (CSI-RS) settings for one or more partial bands within a system bandwidth for channel state information (CSI)-related processing, wherein each partial band includes a set of physical resource blocks (PRBs, receiving partial band CSI reference signals (CSI-RS) from a base station (BS), and transmitting CSI-reporting to the BS, in accordance with the partial band CSI-RS settings.

Certain aspects provide a method for wireless communication by a base station. The method generally includes determining, for a user equipment (UE), channel state information (CSI) subband settings for a user equipment (UE) to use for CSI reporting, transmitting partial band CSI reference signals (CSI-RS) to the UE, and receiving CSI-reporting from the UE, in accordance with the CSI subband settings.

Certain aspects provide a method for wireless communication by a user equipment. The method generally includes determining, channel state information (CSI) subband settings for the UE to use for CSI reporting, receiving partial band CSI reference signals (CSI-RS) from a base station (BS), and transmitting CSI-reporting to the BS, in accordance with the CSI subband settings.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 8A and 8B illustrate example dependency of CSI related parameters to system bandwidth and reporting modes.

FIGS. 9A, 9B, 9C, and 9D illustrate RS ports received in the delay-Doppler domain, when staggering is not applied in RS port multiplexing, according to certain aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
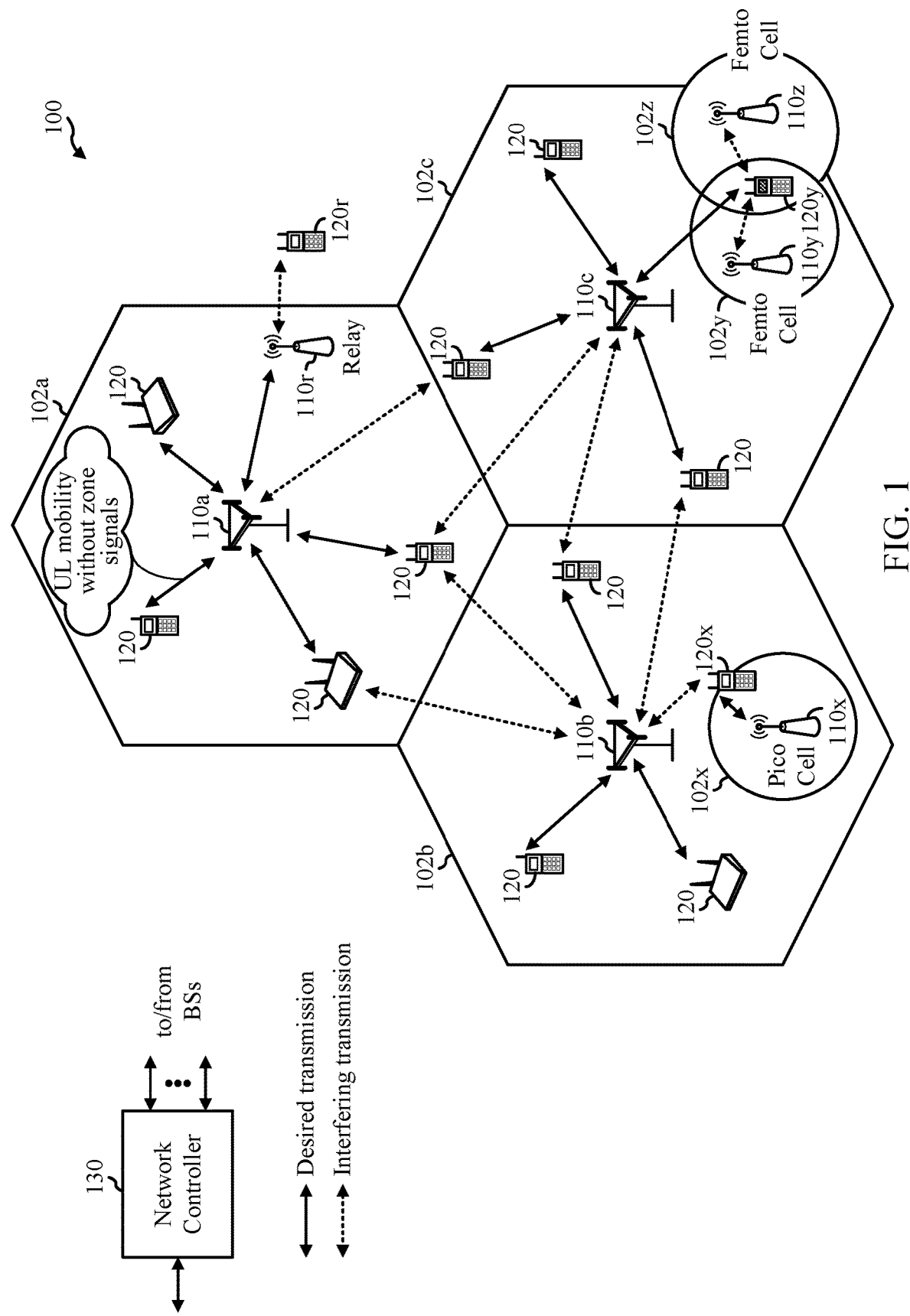
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to methods and apparatus for setting subband CSI-related parameters.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates possible transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., abase station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells may be configured as access cell (ACells) or data only cells (DCells). For example, the RAN (e.g., a central unit or distributed unit) may configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
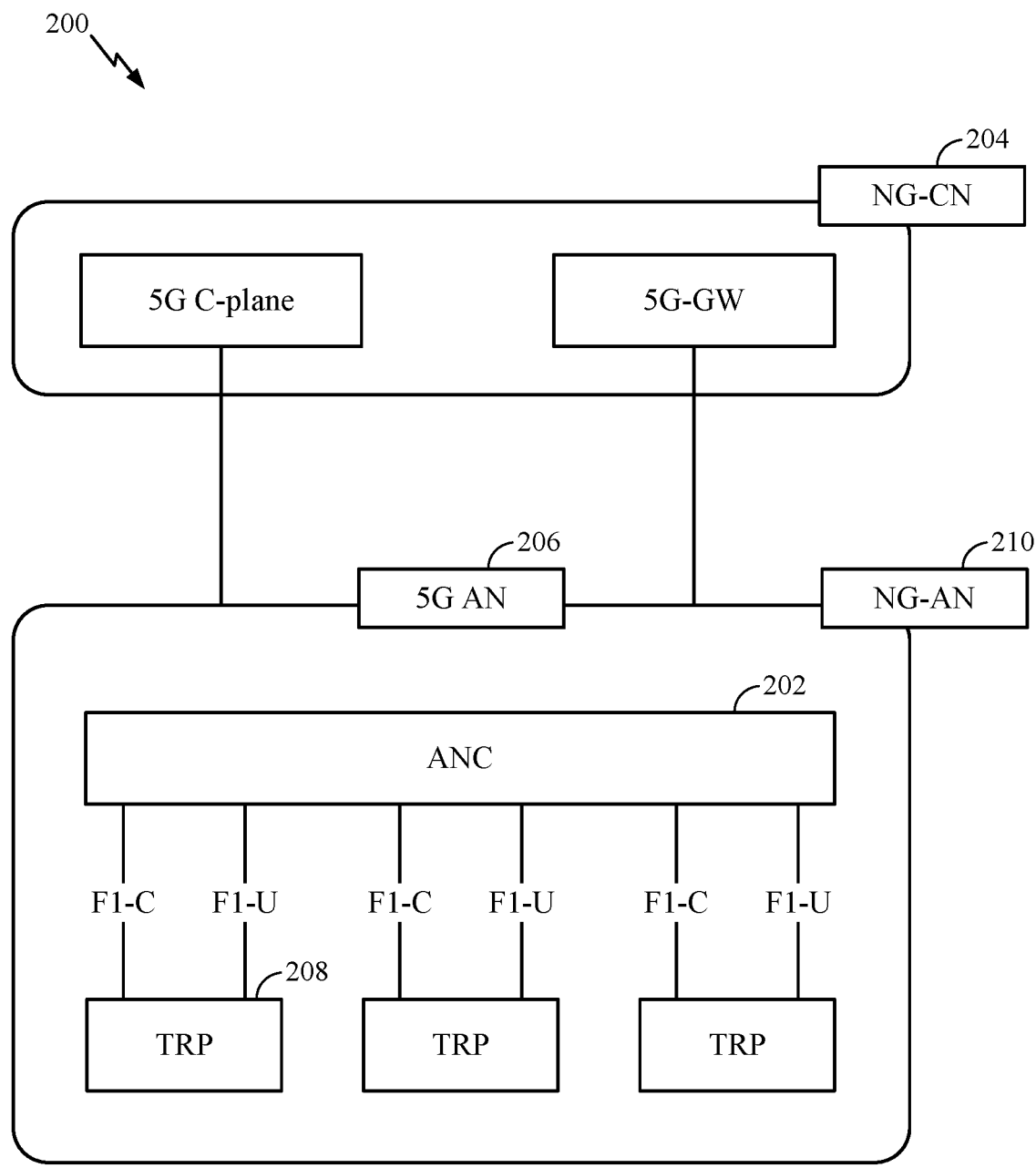
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC 202 or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The distributed RAN 200 architecture may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
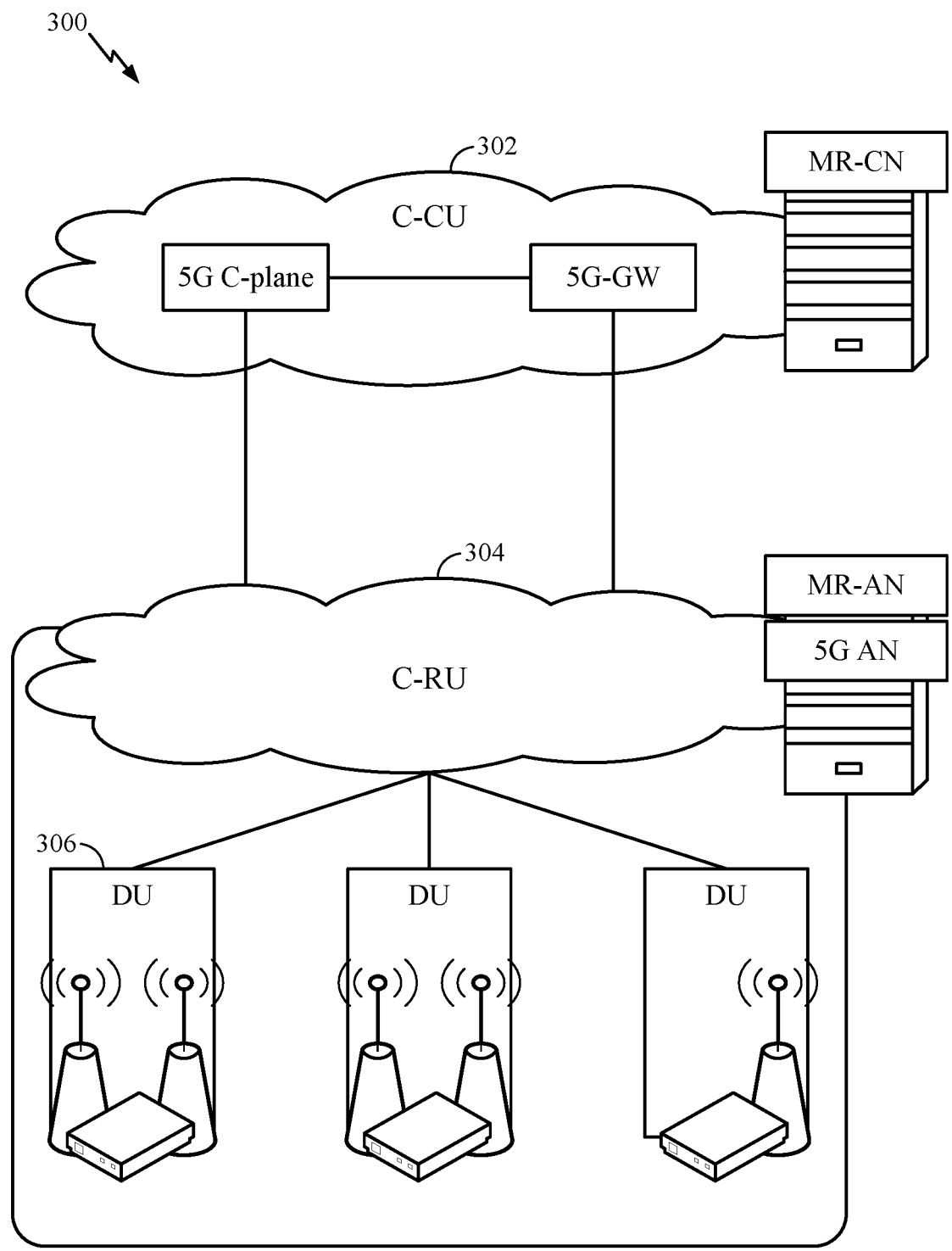
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
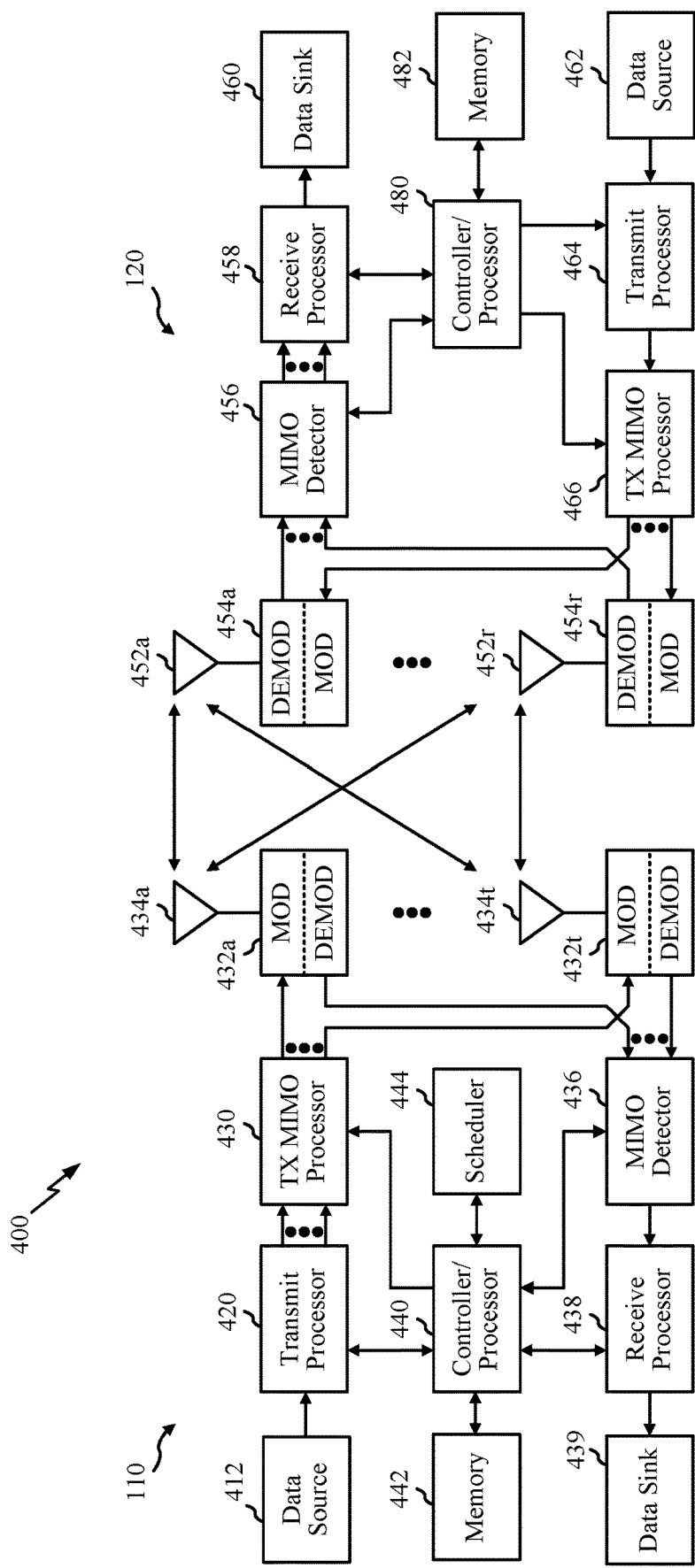
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 454, processors 458, 466, 464, and/or controller/processor 480 of the UE 120 and/or antennas 434, TX/RX 432, processors 420, 430, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator in transceivers 432a through 432t may further process (e.g., convert to analog, amplify, filter, and upconvert) the output sample stream to obtain a downlink signal.

Downlink signals from modulators in transceivers 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator in transceivers 454*a* through 454*r* may condition (e.g., filter, amplify, downconvert, and digitize) a respective received signal to obtain input samples. Each demodulator in transceivers 454*a* through 454*r* may further process the input samples (e.g., for OFDM, etc.) to obtain received symbols. A MIMO detector 456 may obtain received symbols from all the demodulators in transceivers 454*a* through 454*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the demodulators in transceivers 432*a* through 432*t*, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The controller/processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
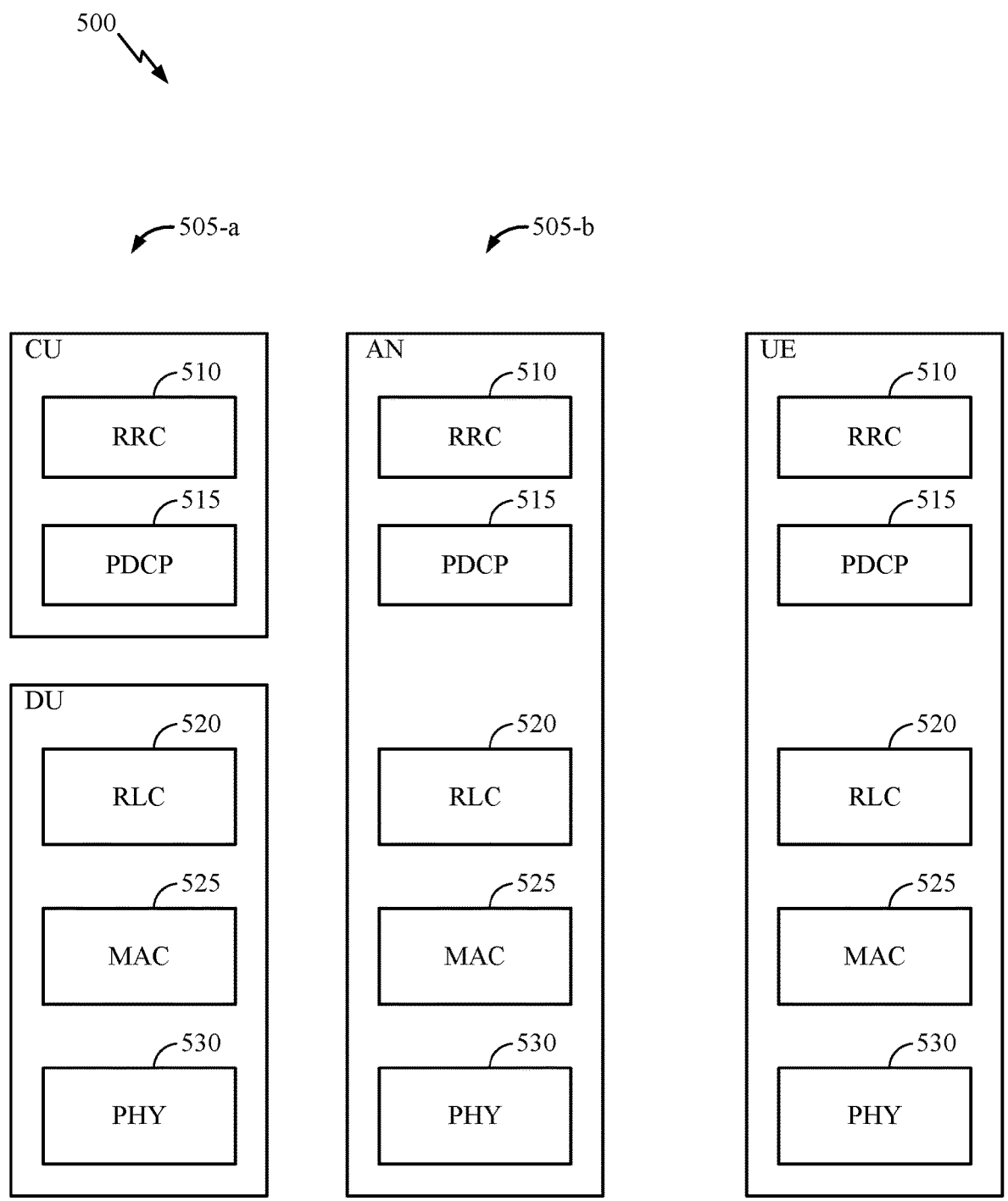
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., TRP 208 in FIG. 2, which may be a DU). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
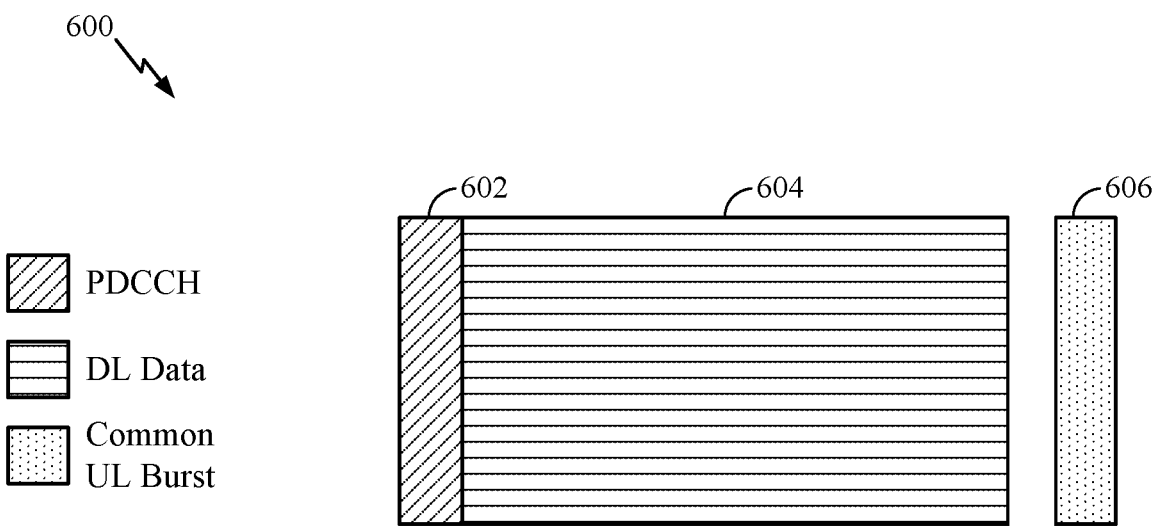
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
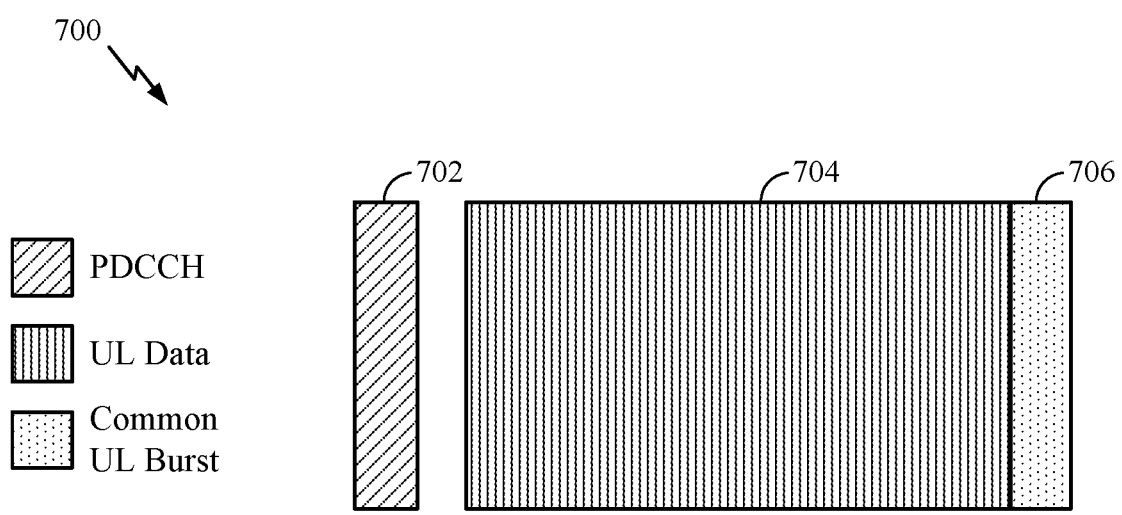
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Techniques for Setting Subband CSI-Related Parameters

LTE supports full-band CSI-RS transmission and subband CSI reporting. In LTE, the subband CSI related parameters are fixed and dependent on system bandwidth. In addition to full-band CSI-RS transmission, NR also supports partial-band CSI-RS transmission. Unfortunately, the use of fixed and system bandwidth dependent subband CSI-related parameters may not flexibly adapt the channel frequency-selectivity or the diverse partial bandwidth configuration.

Further, in LTE, the subband CSI-related parameters are tightly coupled with the CSI reporting mode. If same CSI reporting mode is used, no matter how many CSI processes and/or subframe sets are configured, an identical set of subband CSI related parameters is used regardless of the difference in channel properties associated different CSI processes and/or subframe sets.

In NR, the CSI framework generally consists of CSI reporting settings, RS settings and CSI measurement settings. However, the usage of this framework may be limited if the subband CSI-related parameters are still coupled with the CSI reporting modes.

Therefore, aspects of the present disclosure present some solutions to provide flexible configuration of subband CSI-related parameters that may be applicable for both LTE and NR.

As noted above, LTE may only support full-band CSI-RS transmission (CSI-RS REs across whole system BW). LTE may also support subband CSI reporting to capture the frequency-selectivity of the channel. Subband CSI provides network better link adaptation capability. As shown in FIGS. 8A and 8B, UE selected subband CQI reporting is supported by PUSCH modes 2-0 and 2-2, and PUCCH modes 2-0 and 2-1. Higher layer configured subband CQI reporting is supported by PUSCH modes 3-0, 3-1, 3-2. Subband PMI reporting is supported by PUSCH modes 1-2, 2-2, and 3-2.

The settings of subband CSI related parameters in LTE are fixed depending on system bandwidth and reporting modes. FIGS. 9A-9D illustrate this dependency for PUSCH modes 1-2, 3-0, 3-1, 3-2, PUSCH modes 2-0, 2-2, and PUCCH modes 2-0, 2-1.

In NR, partial-band CSI-RS transmission may be decoupled from the CSI framework. For example, NR may support both full-band and partial-band CSI-RS transmission. Full-band CSI-RS transmission may be similar to that in LTE. In case of partial-band CSI-RS transmission, a UE may be configured with a part of the system bandwidth to transmit CSI-RS. For the NR CSI framework, CSI-related settings may include: CSI reporting settings, CSI parameter settings, and CSI measurement settings. CSI parameters (e.g., PMI and CQI) may be independently configured (e.g. time and/or frequency granularity; turned ON/OFF), RS (at least for CSI measurement) settings may also be independently configured (e.g. CSI-RS with CSI-IM as a special case).

Figure 10:
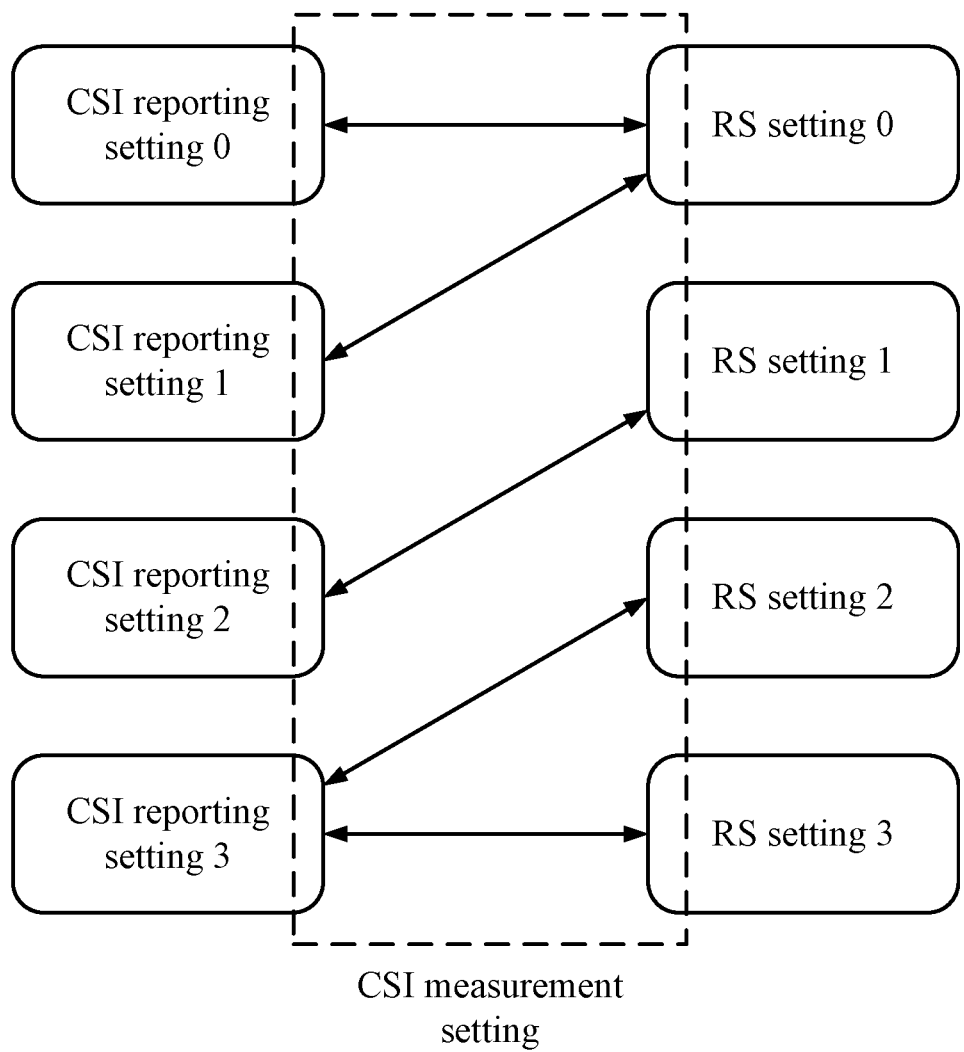
FIG. 10 illustrates an example mapping of RS settings CSI-RS reporting settings.

CSI measurement settings in NR may be considered analogous to a CSI process in LTE. To configure which RS setting is used for a particular CSI reporting setting, a UE may be configured with N CSI reporting settings and M RS (for CSI measurement) settings. The CSI measurement setting may configure a mapping/linkage between CSI reporting and RS settings. FIG. 10 shows an example of a CSI measurement setting configuration mapping between 4 CSI reporting settings and 4 RS settings.

As noted above, system bandwidth dependent fixed subband size may not be able to adapt to frequency-selectivity of the channel. If the channel is less frequency selective, a larger subband may be used to reduce the CSI feedback overhead. Alternatively, if the channel is more frequency selective, a smaller subband may be used to improve CSI accuracy in frequency domain.

System bandwidth dependent settings may result in subbands with unequal sizes. The use of decoupled CSI framework may be limited by tight coupling among subband CSI related parameters and CSI reporting mode. For example, if same CSI reporting mode is used, no matter how many CSI processes and/or subframe sets are configured, an identical set of subband CSI related parameters may be used regardless of the difference in channel properties associated with different CSI processes and/or subframe set.

Figure 11:
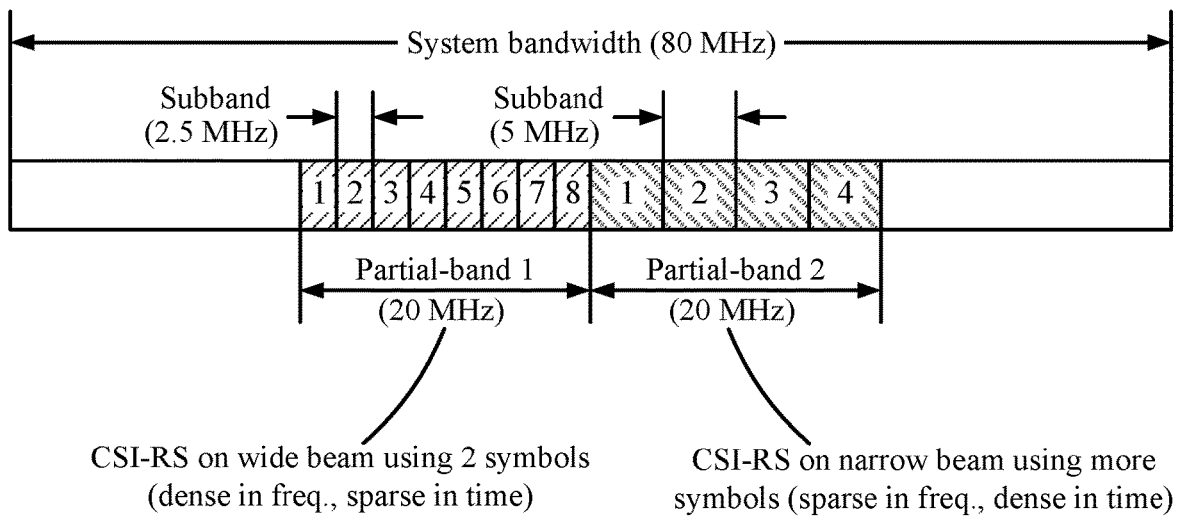
FIG. 11 illustrates example partial bands, according to certain aspects.

Aspects of the present disclosure support partial-band CSI-RS based CSI reporting with flexible settings of subband size and other subband CSI related parameters. Partial-band CSI-RS may be configured with different bandwidth size and/or pattern. FIG. 11 illustrates an example of CSI property settings, in accordance with aspects of the present disclosure.

Figure 12:
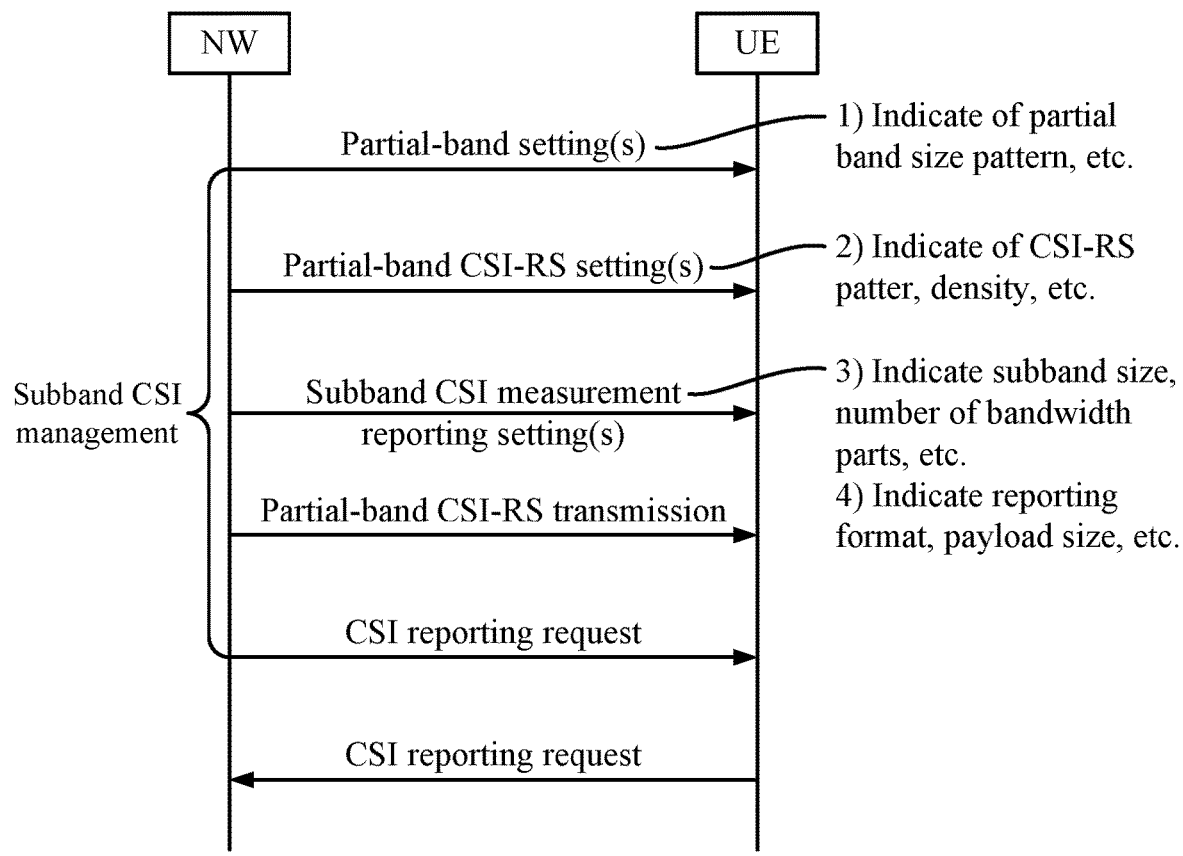
FIG. 12 is an example call flow diagram for setting CSI related subband parameters, in accordance with certain aspects of the present disclosure.

The techniques presented herein may be applied to partial band management, partial band CSI-RS management, and subband CSI measurement/reporting management. As illustrated in FIG. 12, partial band management may involve setting of partial-band properties, such as partial band size and partial band pattern. Partial band CSI-RS management may involve setting of partial-band CSI-RS properties, such as a number of ports and resource configuration. Management of subband CSI measurement/reporting may involve setting of subband CSI properties, such as subband size, number of bandwidth parts, and reporting type/format/payload size/bit-width.

Figure 13:
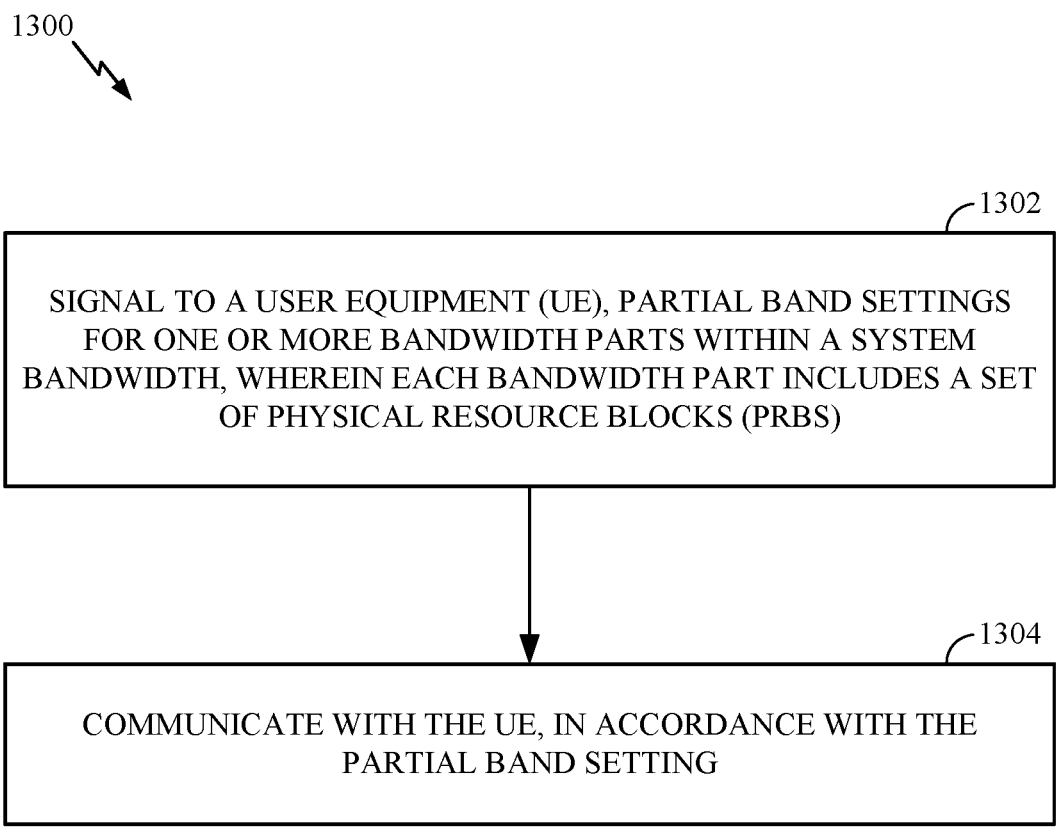
FIG. 13 illustrates example operations for wireless communications by a base station, in accordance with certain aspects of the present disclosure.

FIG. 13 illustrates example operations 1300 for partial band management by a BS, in accordance with certain aspects of the present disclosure.

Operations 1300 begin, at 1302, by signaling to a user equipment (UE), partial band settings for one or more bandwidth parts within a system bandwidth, wherein each bandwidth part includes a set of physical resource blocks (PRBs). At 1304, the BS communicating with the UE, in accordance with the partial band settings.

Figure 13A:
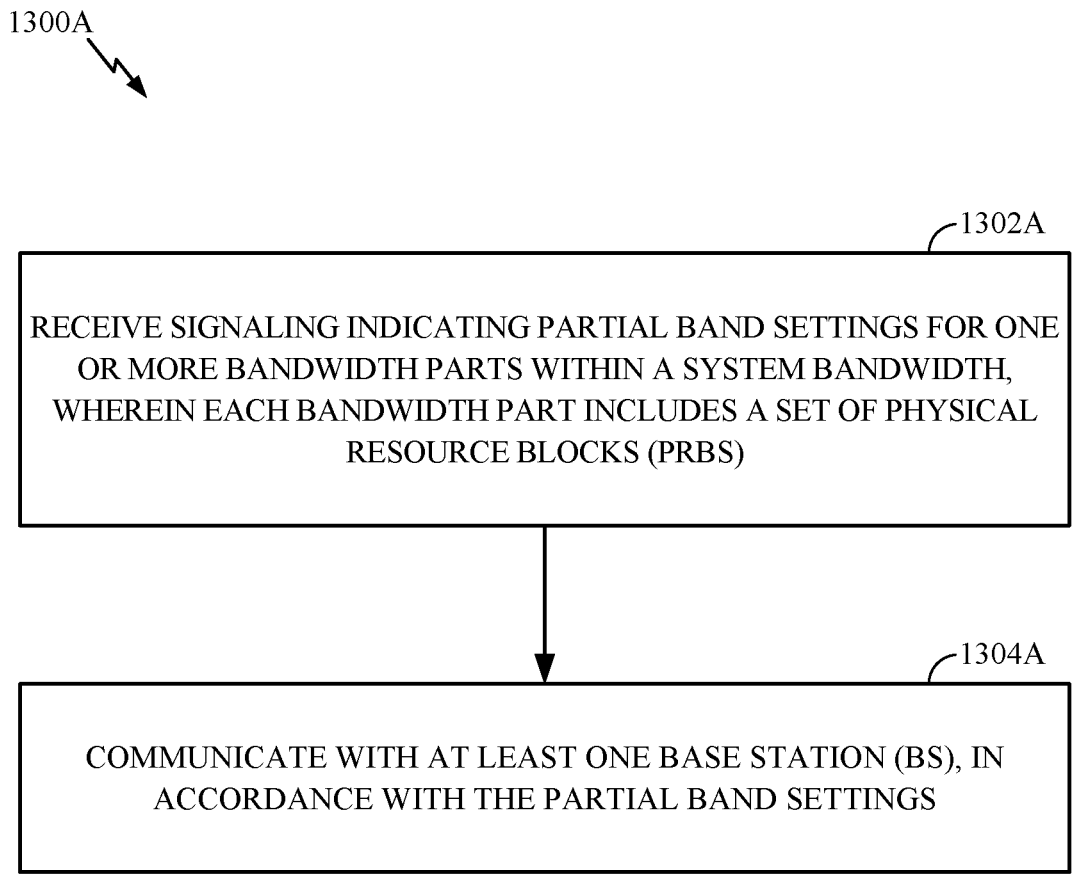
FIG. 13A illustrates example operations for wireless communications by a user equipment, in accordance with certain aspects of the present disclosure.

FIG. 13A illustrates example operations 1300A for partial band management by a user equipment, in accordance with certain aspects of the present disclosure. The (UE-side) operations 1300A may be considered complementary to (BS-side) operations 1300.

Operations 1300A begin, at 1302A, by receiving signaling indicating partial band settings for one or more bandwidth parts within a system bandwidth, wherein each bandwidth part includes a set of physical resource blocks (PRBs). At 1304A, the UE communicating with at least one base station (BS), in accordance with the partial band settings.

Figure 14:
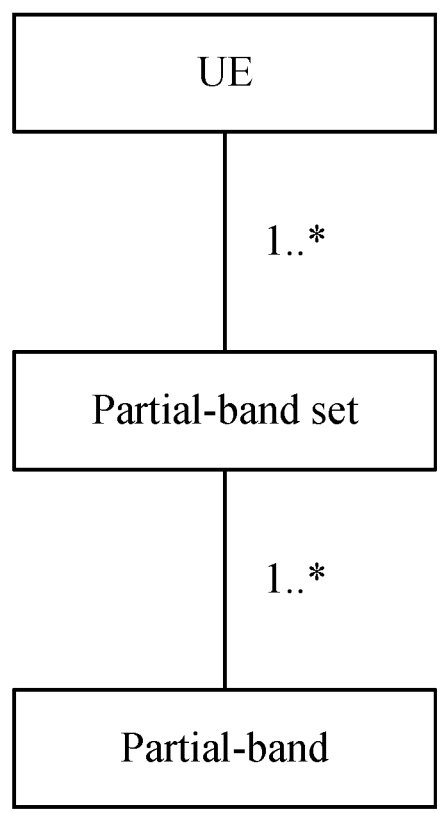
FIG. 14 illustrates an example of bandwidth parts configured for a UE, in accordance with certain aspects of the present disclosure.

As illustrated in FIG. 14, a UE may be configured with one or more partial band sets which may also be referred to as a bandwidth part, with each set having one or more partial bands. A partial-band set may comprise one or multiple partial-bands. A partial-band generally refers to a set of PRBs which may or may not be contiguous. For a UE, the configured sets of partial-bands may spans the entire or part of the system bandwidth.

Figure 15A:
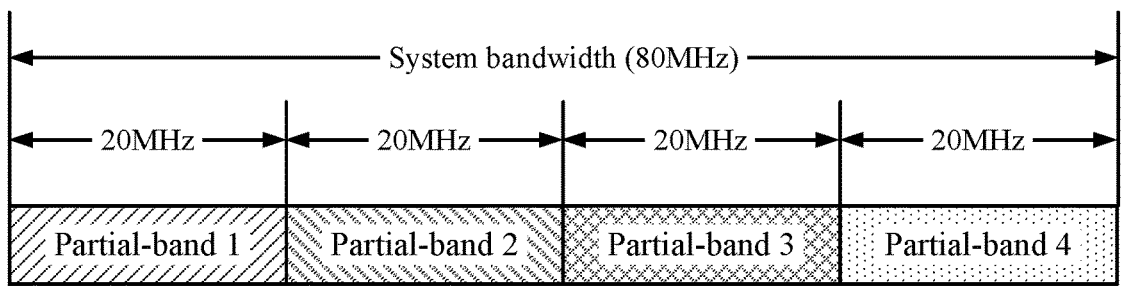
FIGS. 15A, 15B, 15C, and 15D illustrate different examples of bandwidth parts, in accordance with certain aspects of the present disclosure.
Figure 15B:
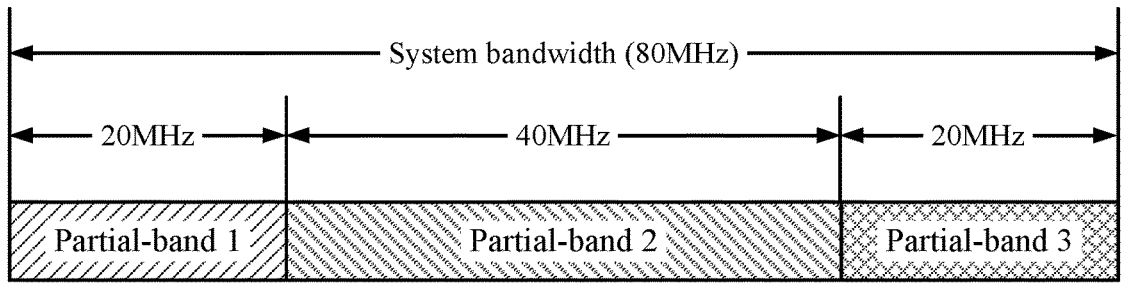
Figure 15C:
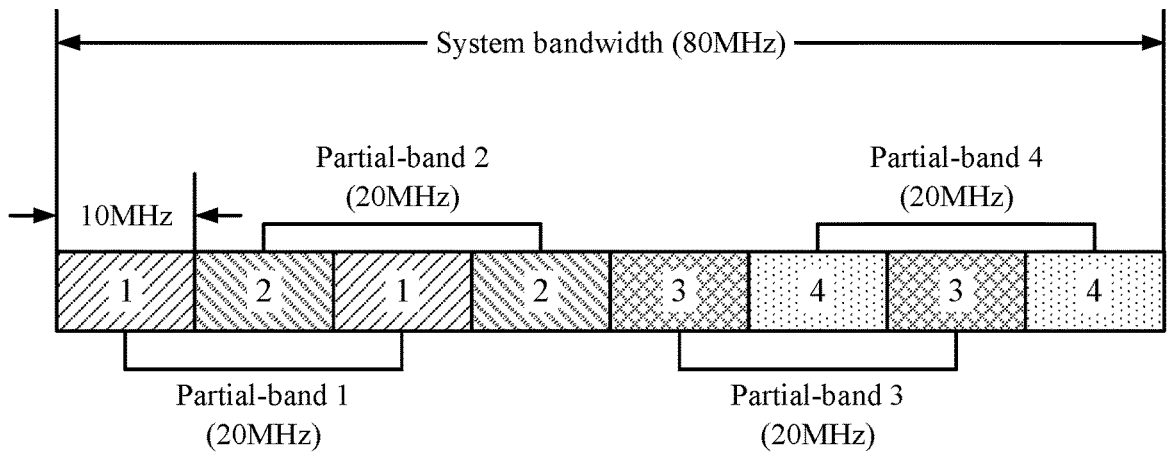
Figure 15D:
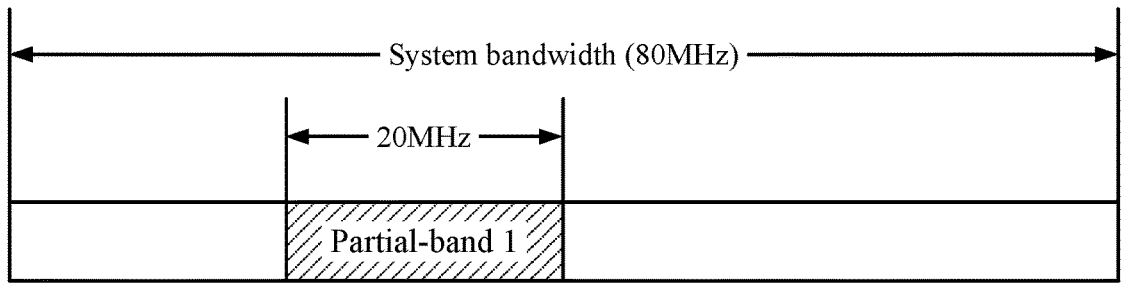

FIG. 15A illustrates an example configuration with a set of equally-sized partial-bands that span the whole system bandwidth. FIG. 15B illustrates an example configuration with a set of unequally-sized partial-bands that spans the whole system bandwidth. As illustrated in FIG. 15C, partial bands within a set may be non-contiguous. As illustrated in FIG. 15D, a partial-band set may have a single partial-band.

The properties of a partial-band/partial-band set may include size (e.g., number of PRBs within a partial band), pattern (e.g., contiguous vs non-contiguous), and location (e.g., indices of start/stop PRBs which may be referred to as PRB indices). The properties of a partial-band/partial-band set may also include various other parameters, such as a number of CSI-RS ports, a number of zero power (ZP) and non-zero power (NZP) CSI-RS configurations, a ratio of PDSCH energy per resource element (EPRE) to CSI-RS EPRE, codebook subset restrictions, and/or CSI reporting modes. The properties of a partial-band/partial-band set may be fixed or dependent on one or more parameters, such as system bandwidth, the bandwidth on which the UE is configured with for data channel, and/or control channel bandwidth (e.g., partial-band/partial-band set may have the same bandwidth as a control channel).

In some cases, the properties of a partial-band/partial-band set may be configured via higher-layer/L2/L1 signaling (e.g., RRC configuration and/or MAC CE and/or DCI). Part or all the properties may be jointly configured/indicated by partial-band CSI-RS settings.

Figure 16:
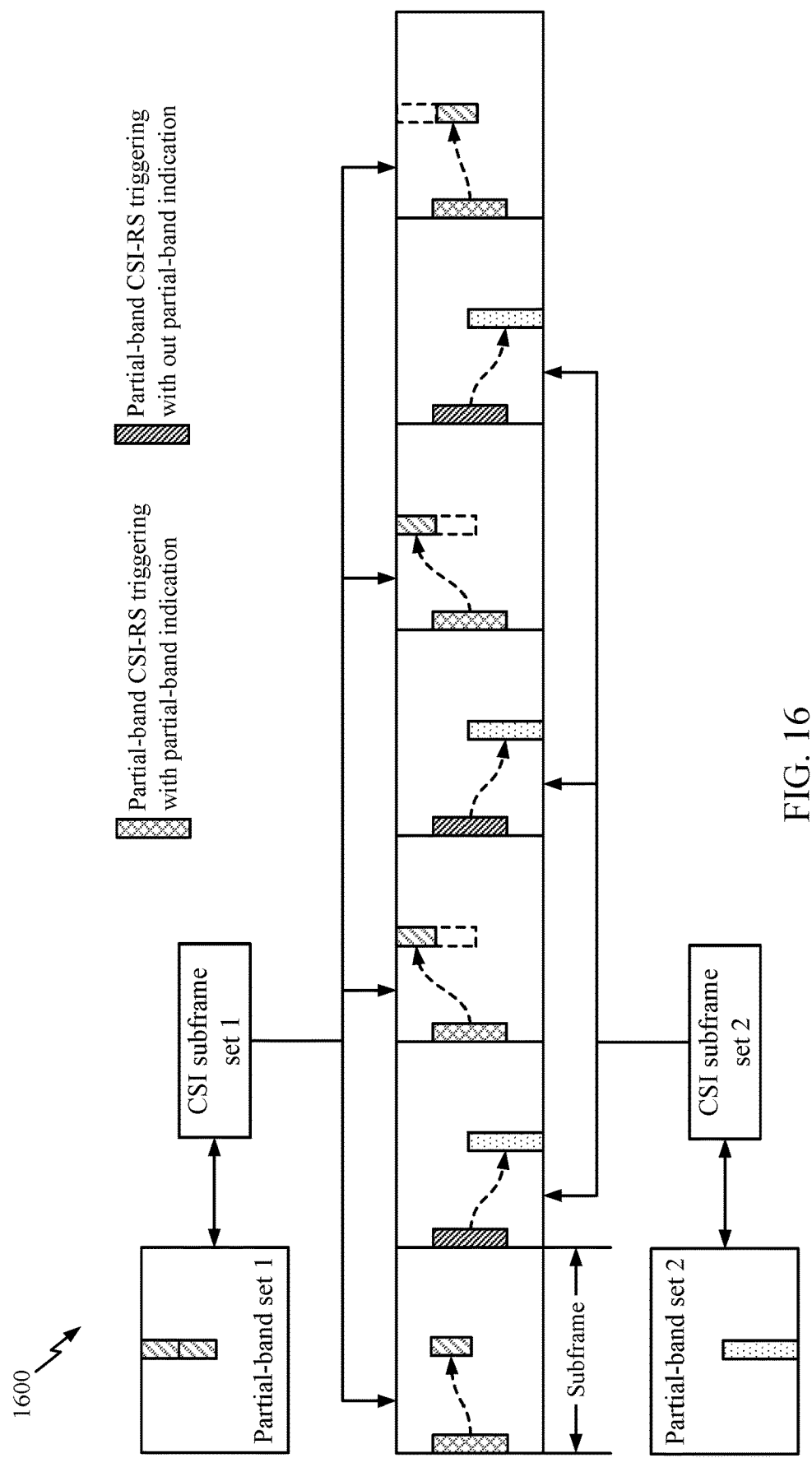
FIG. 16 illustrates an example of partial band management, in accordance with certain aspects of the present disclosure.

FIG. 16 illustrates an example of a subframe set dependent partial-band indication. In the example, there is an implicit indication of a partial-band set based on the subframe set for partial-band set 1, 1 out of 2 partial bands is indicated and/or signaled dynamically. For partial-band set 2, the single partial band is activated by partial-band CSI-RS triggering.

Figure 17:
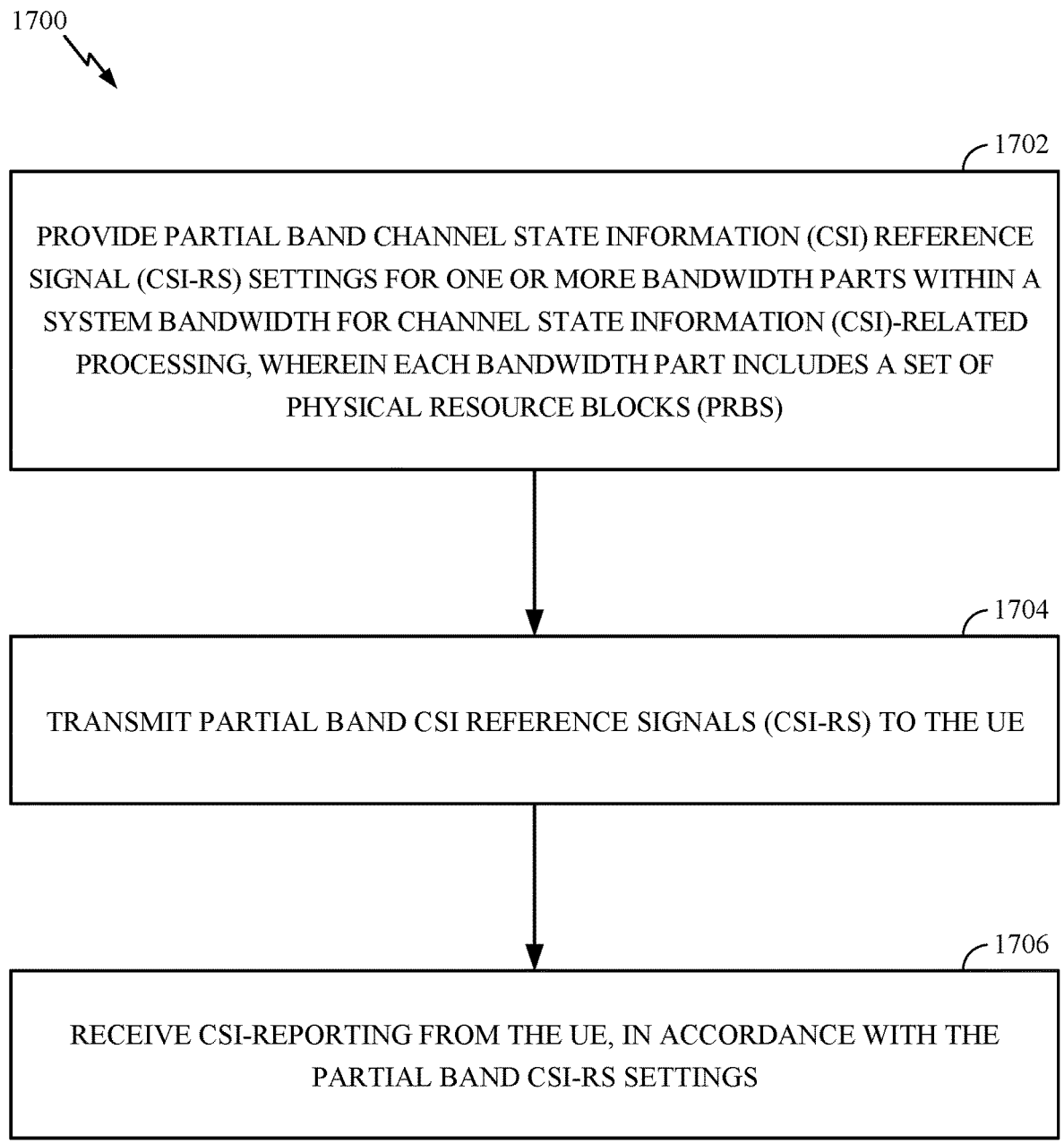
FIG. 17 illustrates example operations for wireless communications by a base station, in accordance with certain aspects of the present disclosure.

FIG. 17 illustrates example operations 1700 for partial band CSI-RS management by a BS, in accordance with certain aspects of the present disclosure.

Operations 1700 begin, at 1702, by providing partial band channel state information (CSI) reference signal (CSI-RS) settings for one or more bandwidth parts within a system bandwidth for channel state information (CSI)-related processing, wherein each bandwidth part includes a set of physical resource blocks (PRBs). At 1704, the BS transmits partial band CSI reference signals (CSI-RS) to the UE. At 1706, the BS receives CSI-reporting from the UE, in accordance with the partial band CSI-RS settings.

Figure 17A:
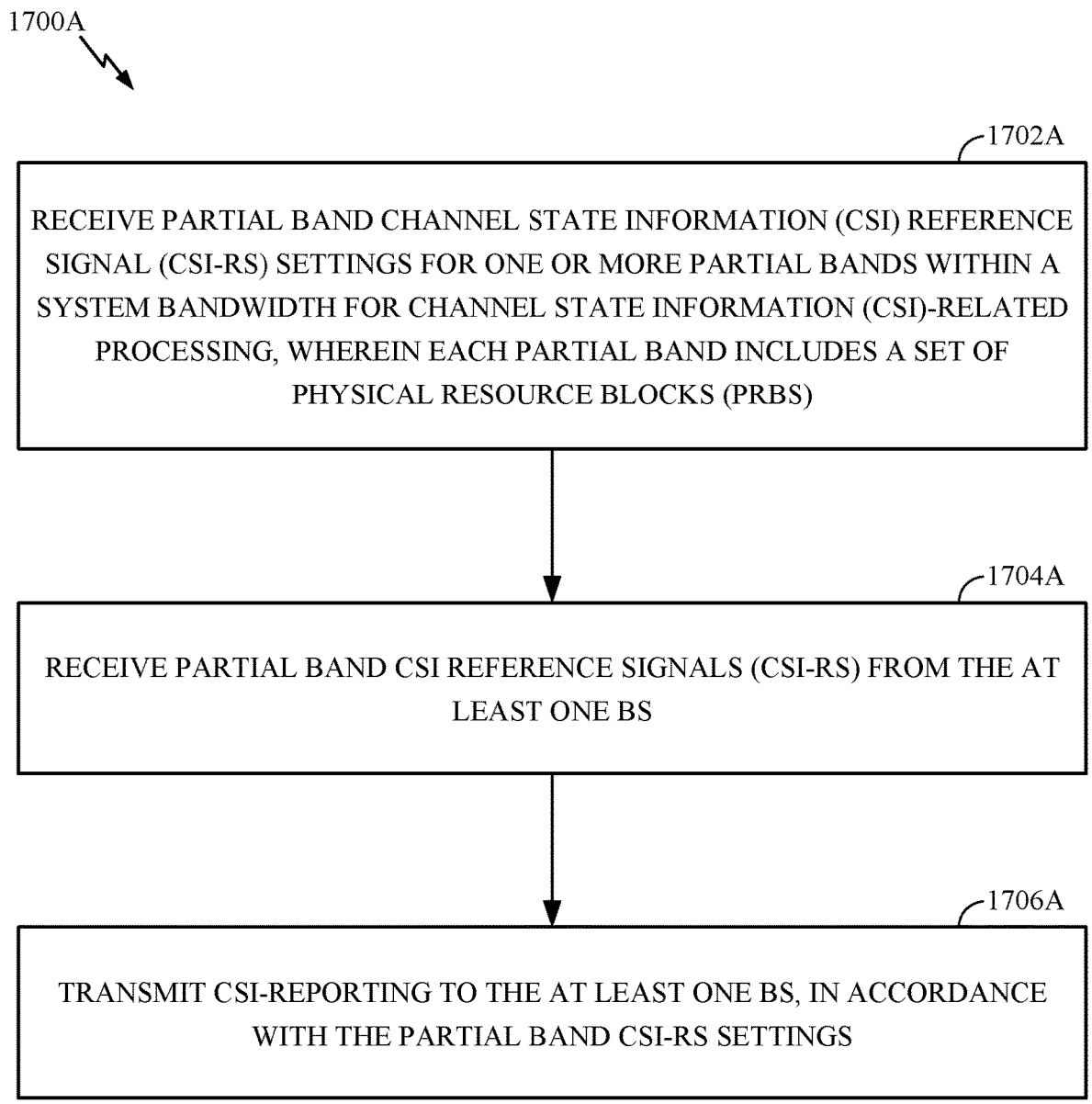
FIG. 17A illustrates example operations for wireless communications by a user equipment, in accordance with certain aspects of the present disclosure.

FIG. 17A illustrates example operations 1700A for partial band CSI-RS management by a user equipment, in accordance with certain aspects of the present disclosure. The (UE-side) operations 1700A may be considered complementary to (BS-side) operations 1700.

Operations 1700A begin, at 1702A, by receiving partial band channel state information (CSI) reference signal (CSI-RS) settings for one or more partial bands within a system bandwidth for channel state information (CSI)-related processing, wherein each partial band includes a set of physical resource blocks (PRBs). At 1704A, the UE receives partial band CSI reference signals (CSI-RS) from the at least one BS. At 1706A, the UE transmits CSI-reporting to the at least one BS, in accordance with the partial band CSI-RS settings.

The properties of a partial-band CSI-RS may include indication of, for example, a number of CSI-RS ports, zero power (ZP) and non-zero power (ZP/NZP) CSI-RS configurations, a ratio of PDSCH energy per resource element (EPRE) to CSI-RS EPRE, codebook subset restrictions, and/or CSI reporting modes. The properties of a partial-band CSI-RS may also include partial-band information (such as described above). Partial-band CSI-RS may be associated with one or more partial-bands/partial-band sets which are configured to the UE. In one or more cases, for example, linkage between a CSI-RS setting and partial-band information may be described by an RRC configuration other than the RRC configuration of the CSI-RS setting and the RRC configuration of the partial-band information. In some cases, partial-band information may be part of partial-band CSI-RS properties (e.g., as part of ZP/NZP CSI-RS configurations). A partial-band CSI-RS may be further associated with a subframe set.

The properties of partial-band CSI-RS may be fixed and dependent on one or more properties, such as system bandwidth and/or partial-band properties, and/or the bandwidth on which the UE is configured with to operate. For example, the partial-band CSI-RS pattern and density in frequency/time domain may be functions of partial-band size. A UE may be configured with one or multiple sets of partial-band CSI-RS properties. CSI-RS properties may be configured directly via higher-layer signaling (e.g., RRC signaling).

In addition, or as an alternative, to direct signaling CSI-RS properties may be indicated indirectly based on the dependency on partial-band/partial-band sets. For example, a UE may be configured with two partial-band sets. For each partial-band set, the UE may determine corresponding partial-band CSI-RS properties as functions of partial-band set properties.

In some cases, partial-band CSI-RS may be triggered or activated. For example, a UE may be indicated that one or multiple partial-band CSI-RS settings shall be assumed for CSI-RS transmission. In some cases, the indication may be implicit. For example, if a UE is indicated that a partial-band CSI-RS transmission happens in a certain subframe, the partial-band CSI-RS setting associated with the subframe set to which that subframe belongs is implicitly indicated. For example, the partial-band CSI-RS settings are determined based on the active partial-band/partial-band set. When a UE has multiple active partial-bands in a subframe, each partial-band may have its own partial-band CSI-RS settings. In other cases, the indication may be explicit, for example, via aperiodic triggering via L1 signaling, activation via L1 signaling or MAC CE, and/or deactivation via L1 signaling or MAC CE.

Figure 18:
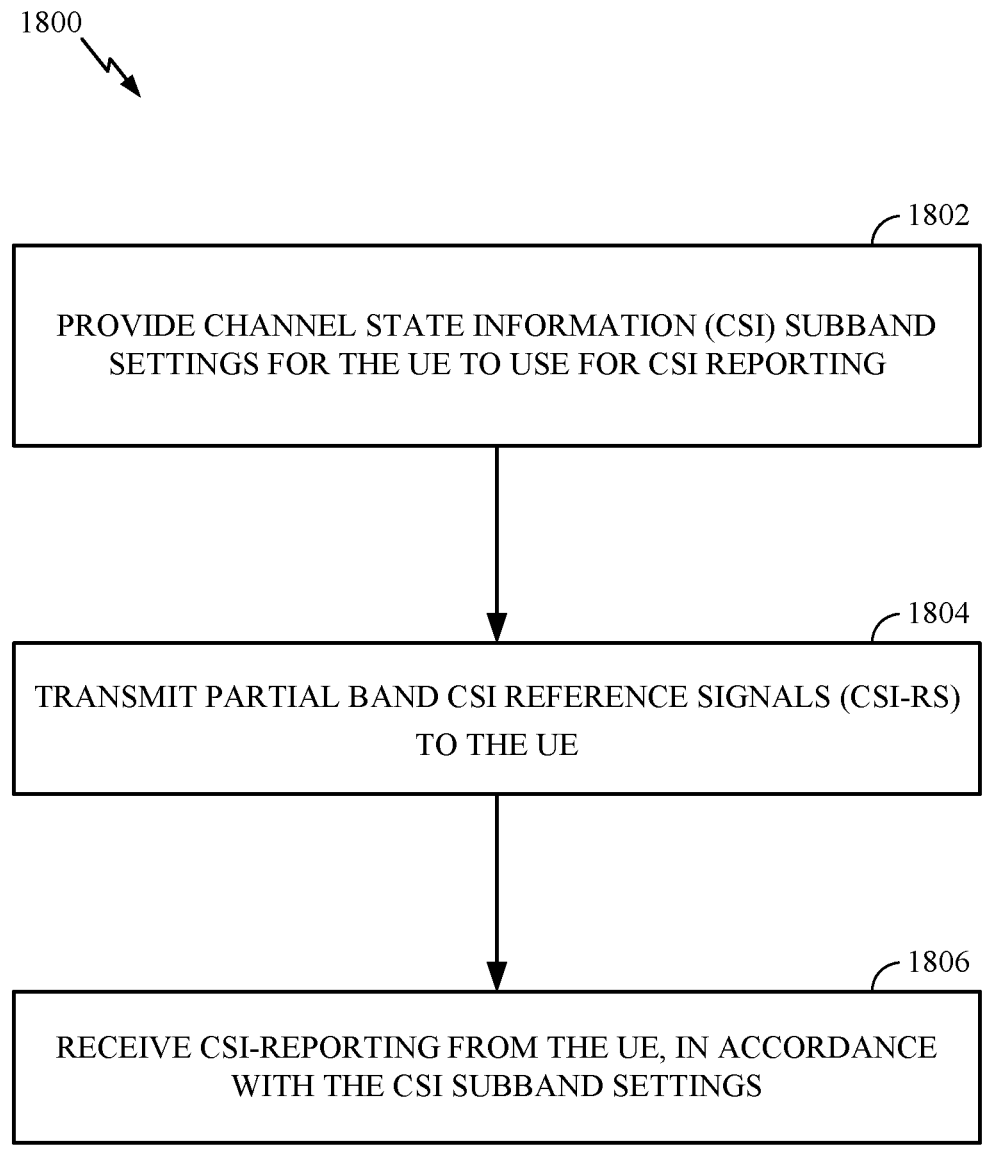
FIG. 18 illustrates example operations for wireless communications by a base station, in accordance with certain aspects of the present disclosure.

FIG. 18 illustrates example operations 1800 for subband CSI management by a BS, in accordance with certain aspects of the present disclosure.

Operations 1800 begin, at 1802, by providing channel state information (CSI) subband settings for the UE to use for CSI reporting. At 1804, the BS transmits partial band CSI reference signals (CSI-RS) to the UE. At 1806, the BS receives CSI-reporting from the UE, in accordance with the CSI subband settings.

Figure 18A:
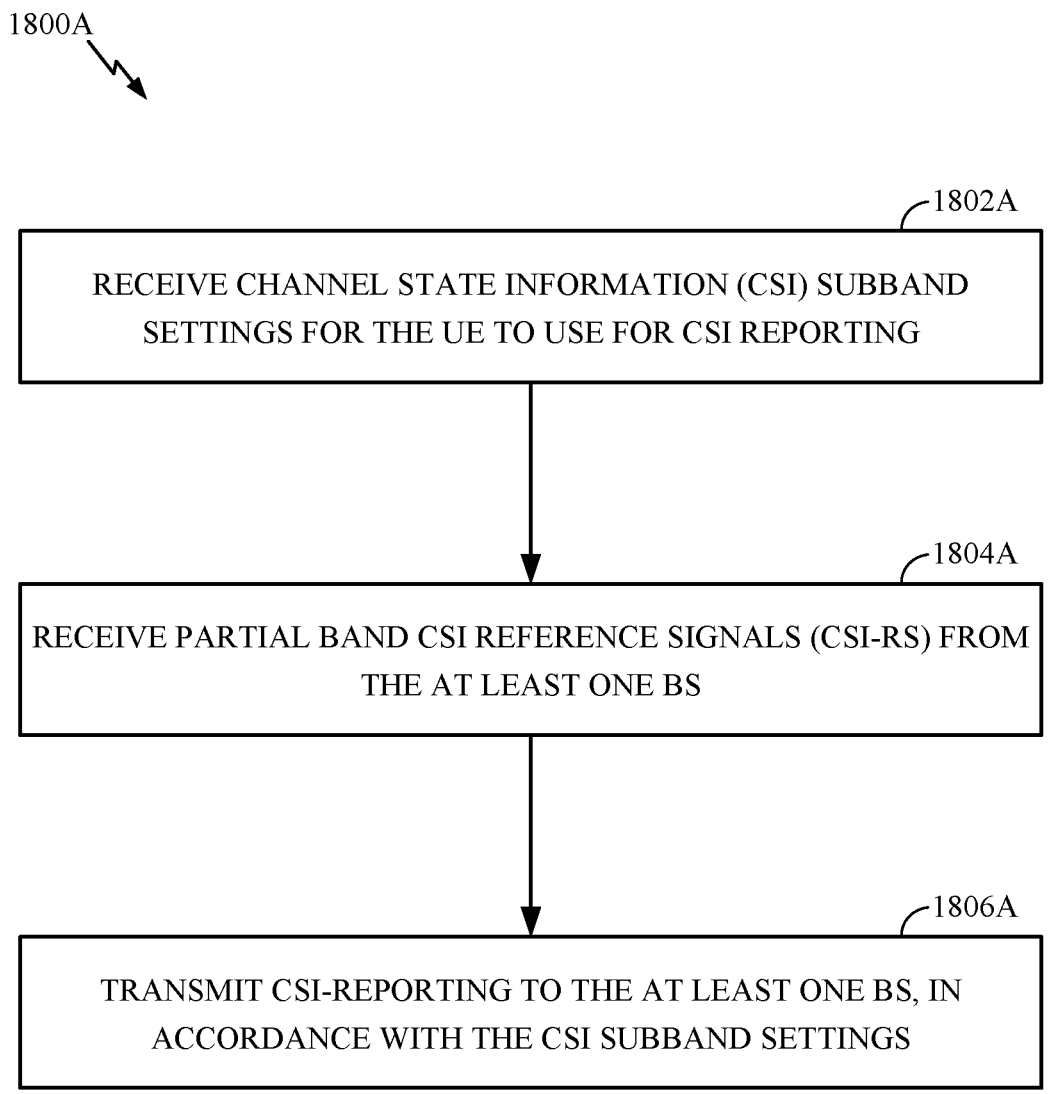
FIG. 18A illustrates example operations for wireless communications by a user equipment, in accordance with certain aspects of the present disclosure.

FIG. 18A illustrates example operations 1800A for subband CSI management by a user equipment, in accordance with certain aspects of the present disclosure. The (UE-side) operations 1800A may be considered complementary to (BS-side) operations 1800.

Operations 1800A begin, at 1802A, by receiving, channel state information (CSI) subband settings for the UE to use for CSI reporting. At 1804A, the UE receives partial band CSI reference signals (CSI-RS) from the at least one BS. At 1806A, the UE transmits CSI-reporting to the at least one BS, in accordance with the CSI subband settings.

The properties of subband CSI may include subband size/number of subbands/bandwidth parts, reporting payload size/bit-width, and reporting format. The properties of subband CSI may be fixed and dependent on one or more properties, such as system bandwidth, properties of a partial-band, properties of a partial-band set, and/or CSI-RS properties. In some cases, at least one subband CSI property may be a function of these properties, while other subband CSI properties may be dependent on those CSI properties which are functions of the aforementioned properties.

Figure 19:
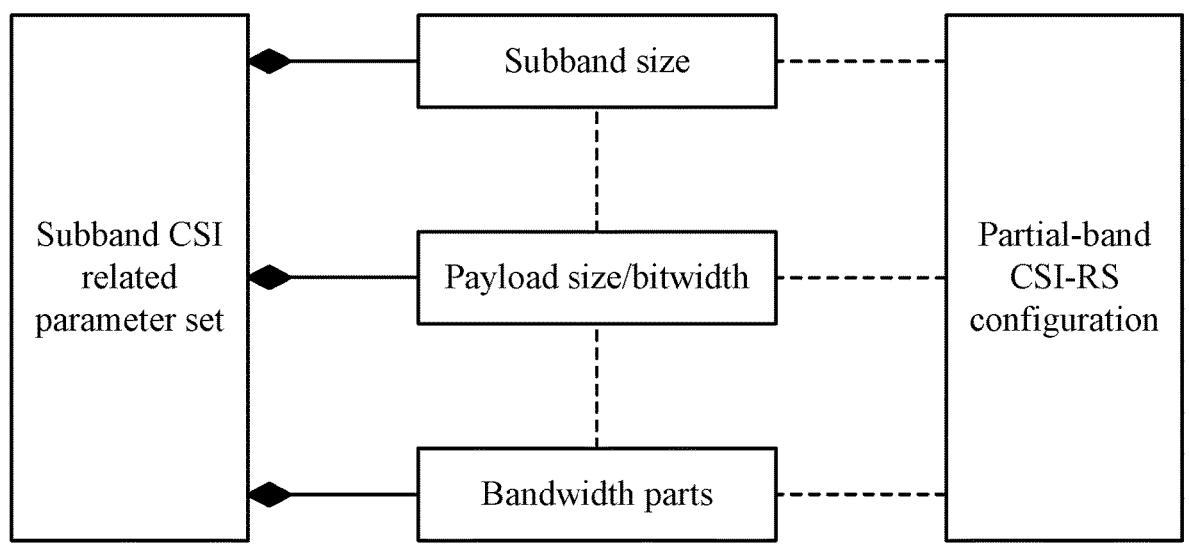
FIG. 19 illustrates an example of subband CSI management, in accordance with certain aspects of the present disclosure.

In some cases, subband CSI properties may be configured/indicated via higher-layer signaling (e.g., RRC configuration), and/or L2 signaling (e.g. MAC CE), and/or L1 signaling (e.g., DCI). FIG. 19 illustrates an example, in which subband size and a number of bandwidth parts may be functions of partial-band size, respectively, while payload size may be a function of both subband size and a number of bandwidth parts, which indirectly depend on partial-band size. In one or more cases, the subband size may depend on at least one of a bandwidth part or a bandwidth part group.

Figure 20:
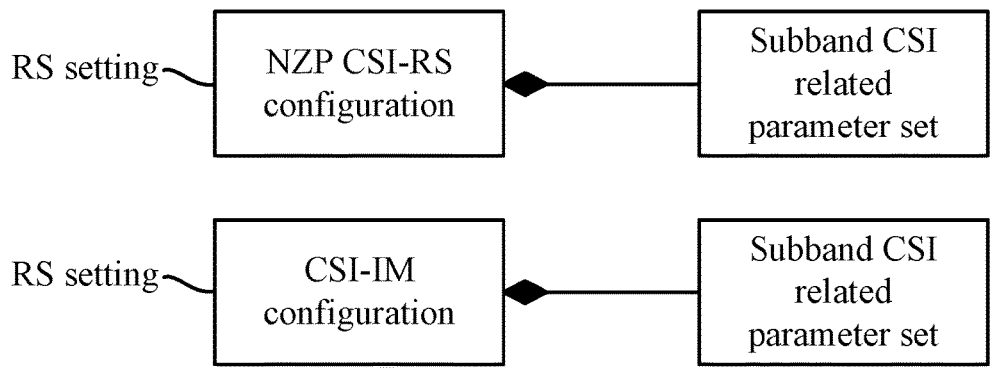
FIG. 20 illustrates an example of subband CSI management, in accordance with certain aspects of the present disclosure.
Figure 21:
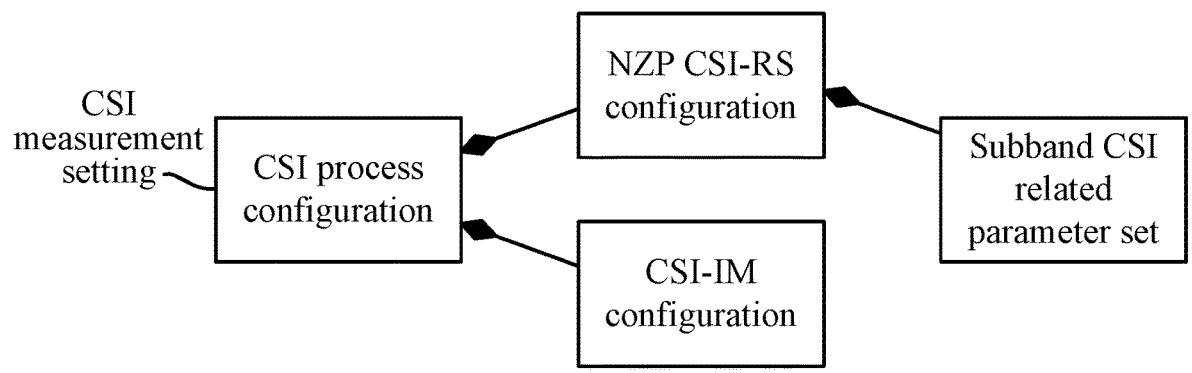
FIG. 21 illustrates another example of subband CSI management, in accordance with certain aspects of the present disclosure.

The properties of subband CSI may be configured (e.g., explicitly indicated) in the form of RS setting (or NZP CSI-RS/CSI-IM configuration). As illustrated in FIG. 20, an RS setting may be provided, for example, via a NZP CSI-RS configuration, a CSI-IM configuration, or the like. Each RS setting may comprise (or be associated with) a set of subband CSI properties. In the case of association, a UE may be configured with multiple sets of subband CSI properties which may or may not be part of CSI reporting settings. As illustrated in FIG. 21, if the CSI-IM is associated with a NZP CSI-RS (e.g., by a CSI measurement setting or by a CSI process configuration), the CSI-IM configuration may not comprise a set of subband CSI properties. In this case, the UE may assume the same set of subband CSI properties as the associated NZP CSI-RS.

Figure 22:
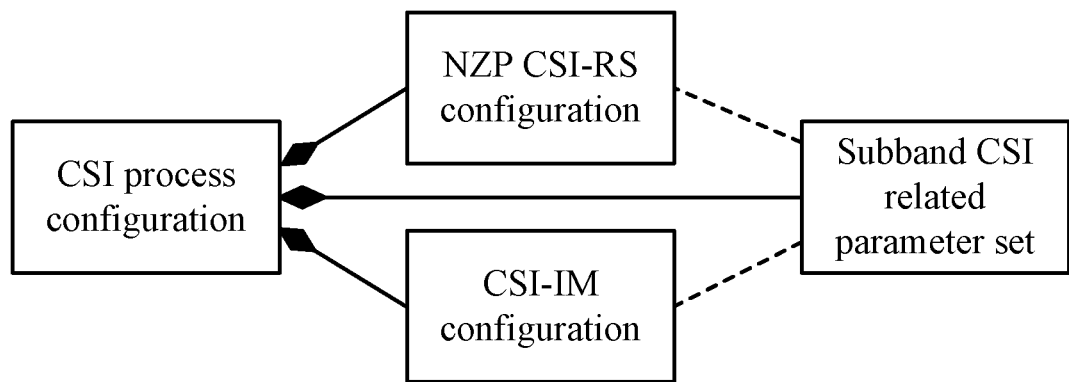
FIG. 22 illustrates yet another example of subband CSI management, in accordance with certain aspects of the present disclosure.
Figure 23:
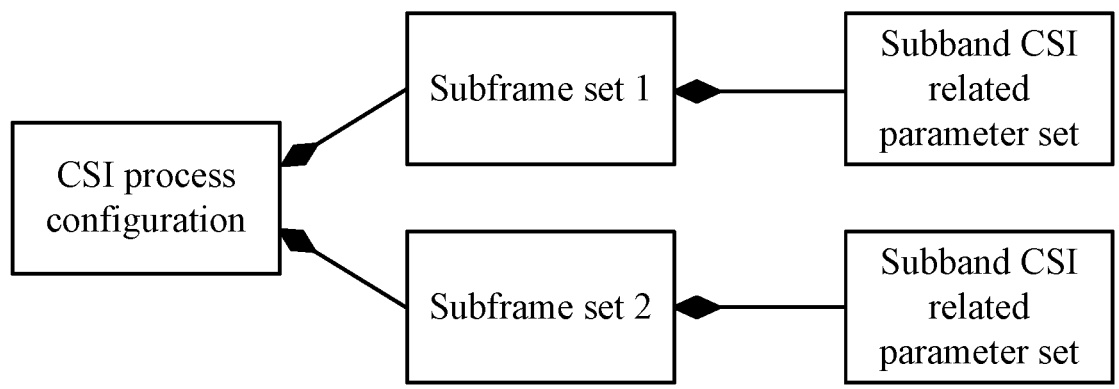
FIG. 23 illustrates another example of subband CSI management, in accordance with certain aspects of the present disclosure.

In some cases, subband CSI properties may be configured in the form of CSI measurement setting (or CSI process configuration). Each CSI process may be associated with a set of subband CSI properties. As illustrated in FIG. 22, for the NZP CSI-RS configuration and/or CSI-IM configuration comprised in a CSI process configuration, a subband CSI property may inherit from the corresponding subband CSI property configured for that CSI process. As illustrated in FIG. 23, if a single CSI-RS process is applicable to two subframe sets, each subframe set may be configured with a respective set of subband CSI properties. Two subframe sets may be associated with different partial-bands or partial-band sets.

In some cases, different sets of properties related to subband CSI management may be applied for different usage scenarios (e.g., different services). For example, eMBB and URLLC may have different subband/partial-band definitions.

In some cases, subband CSI management may be UE-assisted. For example, the NW may request UE to recommend the level of frequency granularity for subband CSI management. On receiving the request, the UE may report a frequency granularity indicator (FGI). For example, the FGI may indicate partial-band size, subband size, or number of subband to indicate the level of frequency selectivity observed from some reference signals (e.g., non-precoded CSI-RS). The FGI may further dependent on a reference PMI and/or a reference RI. The FGI may be derived by assuming using on the reference PMI/RI for precoding. The reference RI may be a previously reported RI for DL link adaptation.

In some cases, the partial-band management for DL may be correlated or applied to UL. For example, the partial-band configured for CSI-RS transmission also applies to partial-band SRS transmission.

Subband CSI management may also be UE-specific. For example, a UE with data bandwidth only localized to a part of the system bandwidth has a first partial-band set for CSI feedback, but a UE with data bandwidth opened up for the entire system bandwidth has a second partial-band set for CSI feedback.

Subband CSI management may also be subframe dependent (or slot dependent) due to potentially different interference statistics (e.g., in different subframes or slots). Different sets of properties of partial-band, CSI-RS, and/or subband CSI may be triggered/activated/deactivated via L1 signaling or MAC CE. Subband CSI management may be associated with CSI reporting periodicity. Different sets of properties of partial-band, CSI-RS, and/or subband CSI may be associated with aperiodic/periodic/semi-persistent CSI reporting.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13, 13A, 17, 17A, 18, and 18A.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving signaling indicating partial band settings for a plurality of bandwidth parts within a system bandwidth for channel state information (CSI)-related processing, wherein:
      each bandwidth part of the plurality of bandwidth parts includes a first set of physical resource blocks (PRBs); and
      each bandwidth part of the plurality of bandwidth parts is a subset of the system bandwidth;
   receiving partial band CSI reference signal (CSI-RS) settings for a plurality of partial bands within the system bandwidth, wherein:
      each partial band of the plurality of partial bands includes a second set of PRBs; and
      each partial band of the plurality of partial bands is a a subset of at least one bandwidth part of the plurality of bandwidth parts;
   receiving partial band CSI-RSs from at least one base station (BS); and
   transmitting CSI-reporting to the at least one BS, in accordance with the partial band CSI-RS settings.

2. The method of claim 1, wherein the partial band settings indicate, for at least one bandwidth part of the plurality of bandwidth parts, at least one of: a partial band size, partial band pattern, or location of a partial band.

3. The method of claim 2, wherein the partial band size is indicated by a number of PRBs within a partial band.

4. The method of claim 1, wherein the partial band settings depend on at least one of: the system bandwidth, a bandwidth in which the UE is configured to receive a data channel, or a bandwidth in which the UE is configured to receive a control channel.

5. The method of claim 1, wherein the partial band settings indicate at least one of: a number of CSI-RS ports, a number of zero power (ZP) or non-zero power (NZP) CSI-RS configurations, codebook restrictions, or CSI reporting modes.

6. The method of claim 1, wherein receiving the signaling indicating the partial band settings comprises receiving an indication of the partial band settings via at least one of layer 1 signaling, layer 2 signaling, or higher-layer signaling.

7. The method of claim 1, wherein the partial band CSI-RS settings indicate at least one of: a number of CSI-RS ports, a number of zero power (ZP) and/or non-zero power (NZP) CSI-RS configurations, codebook restrictions, a ratio of energy per resource element (EPRE) of a data channel to CSI-RS EPRE, or CSI reporting modes.

8. The method of claim 1, wherein the partial band settings are CSI- RS reporting partial band settings.

9. A processing system for wireless communication by a user equipment (UE), comprising:
one or more processors individually or collectively configured to execute instructions stored on one or more memories and to cause the UE to:
receive signaling indicating partial band settings for a plurality of bandwidth parts within a system bandwidth for channel state information (CSI)-related processing, wherein:
each bandwidth part of the plurality of bandwidth parts includes a first set of physical resource blocks (PRBs); and
each bandwidth part of the plurality of bandwidth parts is a subset of the system bandwidth;
receive partial band CSI reference signal (CSI-RS) settings for a plurality of partial bands within the system bandwidth, wherein:
each partial band of the plurality of partial bands includes a second set of PRBs; and
each partial band of the plurality of partial bands is a subset of at least one bandwidth part of the plurality of bandwidth parts;
receive partial band CSI-RSs from at least one base station (BS); and
transmit CSI-reporting to the at least one BS, in accordance with the partial band CSI-RS settings.

10. The processing system of claim 9, wherein the partial band settings indicate, for at least one bandwidth part of the plurality of bandwidth parts, at least one of: a partial band size, partial band pattern, or location of a partial band.

11. The processing system of claim 10, wherein the partial band size is indicated by a number of PRBs within a partial band.

12. The processing system of claim 9, wherein the partial band settings depend on at least one of: the system bandwidth, a bandwidth in which the UE is configured to receive a data channel, or a bandwidth in which the UE is configured to receive a control channel.

13. The processing system of claim 9, wherein the partial band settings indicate at least one of: a number of CSI-RS ports, a number of zero power (ZP) or non-zero power (NZP) CSI-RS configurations, codebook restrictions, or CSI reporting modes.

14. The processing system of claim 9, wherein the one or more processors are further configured to cause the UE to receive an indication of the partial band settings via at least one of layer 1 signaling, layer 2 signaling, or higher-layer signaling.

15. The processing system of claim 9, wherein the partial band CSI-RS settings indicate at least one of: a number of CSI-RS ports, a number of zero power (ZP) and/or non-zero power (NZP) CSI-RS configurations, codebook restrictions, a ratio of energy per resource element (EPRE) of a data channel to CSI-RS EPRE, or CSI reporting modes.

16. The processing system of claim 9, wherein the partial band settings are CSI-RS reporting partial band settings.

17. A method for wireless communication by a base station (BS), comprising:
transmitting, to a user equipment (UE), signaling indicating partial band settings for a plurality of bandwidth parts within a system bandwidth for channel state information (CSI)-related processing, wherein:
each bandwidth part of the plurality of bandwidth parts includes a first set of physical resource blocks (PRBs); and
each bandwidth part of the plurality of bandwidth parts is a subset of the system bandwidth;
transmitting, to the UE, partial band CSI reference signal (CSI-RS) settings for a plurality of partial bands within the system bandwidth, wherein:
each partial band of the plurality of partial bands includes a second set of PRBs; and
each partial band of the plurality of partial bands is a subset of at least one bandwidth part of the plurality of bandwidth parts;
transmitting, to the UE, partial band CSI-RSs; and
receiving, from the UE, CSI-reporting in accordance with the partial band CSI-RS settings.

18. The method of claim 17, wherein the partial band settings indicate, for at least one bandwidth part of the plurality of bandwidth parts, at least one of: a partial band size, partial band pattern, or location of a partial band.

19. The method of claim 18, wherein the partial band size is indicated by a number of PRBs within a partial band.

20. The method of claim 17, wherein the partial band settings depend on at least one of: the system bandwidth, a bandwidth in which the UE is configured to receive a data channel, or a bandwidth in which the UE is configured to receive a control channel.

21. The method of claim 17, wherein the partial band settings indicate at least one of: a number of CSI-RS ports, a number of zero power (ZP) or non-zero power (NZP) CSI-RS configurations, codebook restrictions, or CSI reporting modes.

22. The method of claim 17, wherein transmitting the signaling indicating partial band settings comprises transmitting an indication of the partial band settings via at least one of layer 1 signaling, layer 2 signaling, or higher-layer signaling.

23. The method of claim 17, wherein the partial band CSI-RS settings indicate at least one of: a number of CSI-RS ports, a number of zero power (ZP) and/or non-zero power (NZP) CSI-RS configurations, codebook restrictions, a ratio of energy per resource element (EPRE) of a data channel to CSI-RS EPRE, or CSI reporting modes.

24. The method of claim 17, wherein the partial band settings are CSI-RS reporting partial band settings.

25. A processing system for wireless communication by a base station (BS), comprising:
one or more processors individually or collectively configured to execute instructions stored on one or more memories and to cause the BS to:

transmit, to a user equipment (UE), signaling indicating partial band settings for a plurality of bandwidth parts within a system bandwidth for channel state information (CSI)-related processing, wherein:
  each bandwidth part of the plurality of bandwidth parts includes a first set of physical resource blocks (PRBs); and
  each bandwidth part of the plurality of bandwidth parts is a subset of the system bandwidth;
transmit, to the UE, partial band CSI reference signal (CSI-RS) settings for a plurality of partial bands within the system bandwidth, wherein:
  each partial band of the plurality of partial bands includes a second set of PRBs; and
  each partial band of the plurality of partial bands is a subset of at least one bandwidth part of the plurality of bandwidth parts;
transmit, to the UE, partial band CSI-RSs; and
receive, from the UE, CSI-reporting in accordance with the partial band CSI-RS settings.

26. The processing system of claim 25, wherein:
the partial band settings indicate, for at least one bandwidth part of the plurality of bandwidth parts, at least one of: a partial band size, partial band pattern, or location of a partial band; and
the partial band size is indicated by a number of PRBs within a partial band.

27. The processing system of claim 25, wherein at least one of:
  the partial band settings depend on at least one of: the system bandwidth, a bandwidth in which the UE is configured to receive a data channel, or a bandwidth in which the UE is configured to receive a control channel; or
  the partial band settings indicate at least one of: a number of CSI-RS ports, a number of zero power (ZP) or non-zero power (NZP) CSI-RS configurations, codebook restrictions, or CSI reporting modes.

28. The processing system of claim 25, wherein transmitting the signaling indicating partial band settings comprises transmitting an indication of the partial band settings via at least one of layer 1 signaling, layer 2 signaling, or higher-layer signaling.

29. The processing system of claim 25, wherein the partial band CSI- RS settings indicate at least one of: a number of CSI-RS ports, a number of zero power (ZP) and/or non-zero power (NZP) CSI-RS configurations, codebook restrictions, a ratio of energy per resource element (EPRE) of a data channel to CSI-RS EPRE, or CSI reporting modes.

30. The processing system of claim 25, wherein the partial band settings are CSI-RS reporting partial band settings.

* * * * *